US008862769B2

(12) United States Patent
Watson et al.

(10) Patent No.: US 8,862,769 B2
(45) Date of Patent: Oct. 14, 2014

(54) OBJECT-BASED TRANSPORT PROTOCOL

(75) Inventors: Mark Watson, San Francisco, CA (US); Lorenzo Vicisano, Berkeley, CA (US); Bin Wang, Fremont, CA (US); Shuzhen Chen, Fremont, CA (US); Payam Pakzad, Mountain View, CA (US); Saumitra Mohan Das, San Jose, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 12/952,729

(22) Filed: Nov. 23, 2010
(Under 37 CFR 1.47)

(65) Prior Publication Data

US 2012/0131223 A1     May 24, 2012

(51) Int. Cl.
G06F 15/16     (2006.01)
H04L 29/08     (2006.01)
H04L 29/06     (2006.01)

(52) U.S. Cl.
CPC ............... *H04L 69/16* (2013.01); *H04L 69/326* (2013.01); *H04L 67/14* (2013.01); *H04L 69/32* (2013.01)
USPC ........................... 709/235; 709/230; 709/232

(58) Field of Classification Search
USPC ......................................... 709/230, 232, 235
See application file for complete search history.

(56) References Cited

U.S. PATENT DOCUMENTS

| 5,737,022 | A | 4/1998 | Yamaguchi et al. | |
|---|---|---|---|---|
| 5,835,728 | A | 11/1998 | Shinomiya et al. | |
| 6,438,603 | B1 * | 8/2002 | Ogus | 709/233 |
| 7,120,662 | B2 | 10/2006 | Vange et al. | |
| 7,145,898 | B1 * | 12/2006 | Elliott | 370/352 |
| 7,349,337 | B1 * | 3/2008 | Mahdavi | 370/230.1 |
| 7,496,748 | B2 * | 2/2009 | Mercer et al. | 713/150 |
| 7,724,665 | B2 | 5/2010 | Tanaka | |
| 7,761,585 | B2 | 7/2010 | Vellanki | |
| 2006/0182101 | A1 * | 8/2006 | Hoekstra et al. | 370/389 |
| 2008/0151758 | A1 | 6/2008 | Weinrib et al. | |
| 2009/0013092 | A1 | 1/2009 | Pao et al. | |
| 2009/0274215 | A1 | 11/2009 | Metsugi | |
| 2010/0226434 | A1 | 9/2010 | Lee et al. | |
| 2010/0232429 | A1 * | 9/2010 | Rao et al. | 370/389 |

FOREIGN PATENT DOCUMENTS

CN     1545321 A     11/2004

OTHER PUBLICATIONS

Samtani, et al.; "SCTP Multistreaming: Preferential Treatment Among Streams." IEEE Military Communications Conference; 2003, vol. 2; pp. 966-970.
Lim et al., "Description of video coding technology proposal by SK telecom, Sejong Univ. and Sungkyunkwan Univ.," Document: JCTVC-A113, Dresden, DE, Apr. 15-23, 2010, 41 pp.

(Continued)

*Primary Examiner* — Hee Soo Kim
(74) *Attorney, Agent, or Firm* — Kristine U. Ekwueme

(57) ABSTRACT

Methods and apparatuses are provided that facilitate providing an object-based transport protocol that allows transmission of arbitrarily sized objects over a network protocol layer. The object-based transport protocol can also provide association of metadata with the objects to control communication thereof, and/or communication of response objects. Moreover, the object-based transport protocol can maintain sessions with remote network nodes that can include multiple channels, which can be updated over time to seamlessly provide mobility, increased data rates, and/or the like. In addition, properties can be modified remotely by network nodes receiving objects related to the properties.

41 Claims, 15 Drawing Sheets

(56) References Cited

OTHER PUBLICATIONS

International Search Report and Written Opinion—PCT/US2011/062119—ISA/EPO—Mar. 12, 2012.

Rizzo L. "Effective Erasure Codes for Reliable Computer Communication Protocols," Computer Communication Review, 27 (2) pp. 24-36 (Apr. 1, 1997), XP000696916.

* cited by examiner

OBJECT-BASED TRANSPORT PROTOCOL

BACKGROUND

1. Field

The following description relates generally to network communications, and more particularly to providing an object-based transport layer protocol.

2. Background

Networks allow communication between a plurality of nodes that are interconnected by wireless and/or wired media. Typical network architectures comprise multiple communication layers that facilitate communicating between the plurality of nodes. In one example, a network architecture can comprise media layers (e.g., a physical layer, data link layer, network layer, etc.) host layers (e.g., transport layer, session layer, presentation layer, application layer, etc.), and/or the like, that the nodes can utilize for communicating. For example, the media layers can facilitate transmitting low level data over physical media, such as a network cable, wireless signal, and/or the like, and the host layers can interpret the low level data for presenting to an application. In an example, the transport layer in Internet architecture can include a transmission control protocol (TCP), which provides ordered delivery of a stream of bytes (related to upper layers) from one node on a network to another node on the network.

At a network layer, for example, internet protocol (IP) can be utilized to establish connection between the nodes (e.g., via a router or a direct connection), and route data among the nodes. For example, the IP layer can generate packets of data from a TCP layer and include one or more headers in the packets to facilitate routing. In addition, TCP can manage the IP connection ensuring reliable delivery of the ordered stream of bytes. For example, TCP can also provide retransmission mechanisms for packets that are not properly received, flow control to limit a transmission rate for reliability, and congestion control to protect the network from receiving incoming data above a threshold level. In another example, a transport layer can be a user datagram protocol (UDP), which is less robust than TCP, offering no retransmission, flow control, or congestion control.

Enhancements to network communications have allowed network devices to simultaneously leverage various network technologies to provide multiple connections to the Internet or another network. In this regard, a network device, at any given point in time, can have one or multiple different Internet or other network connections through different networks (and/or network architectures). For example, a network device can have one or more third generation partnership project (3GPP) connections along with one or more WiFi connections, which can be utilized to access similar or different Internet content from one or more disparate network devices. In addition, network devices can simultaneously receive data over the Internet or another network for multiple applications, and a user of the network device can switch among the applications rendering requested data no longer necessary (at least for the time being). TCP, UDP, and other transport layer protocols are ill-equipped to optimize such functionality.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with providing an object-based transport protocol in network communications. For example, the object-based transport protocol allows for communication of arbitrarily sized objects between one or more network nodes. In addition, for example, the objects can have associated metadata parameters such as priority, transmission deadline, etc., which can be utilized to control communication of the objects. In one example, a receiver of the objects can control communication thereof by a sender by utilizing the metadata parameters. Moreover, the object-based transport protocol can manage sessions for communicating the objects over a set of physical connections to one or more networks that can be modified over time to provide transparency with respect to the physical connections.

According to an example, a method of providing an object-based transport layer in network communications is illustrated that includes receiving one or more objects from an application for communicating to a remote network node and receiving metadata for the one or more objects from the application. The method also includes selecting a session for communicating the one or more objects to the remote network node and providing the one or more objects to a network protocol layer for transmitting over at least one network interface related to a channel of the session based at least in part on a priority indicated in the metadata.

In another aspect, an apparatus for providing an object-based transport layer in network communications is provided that includes at least one processor configured to obtain one or more objects from an application for communicating to a remote network node and obtain metadata for the one or more objects from the application. The at least one processor is further configured to determine a session for communicating the one or more objects to the remote network node and communicate the one or more objects to a network protocol layer for transmitting over at least one network interface related to a channel of the session based at least in part on a priority indicated in the metadata. In addition, the wireless communications apparatus includes a memory coupled to the at least one processor.

In yet another aspect, an apparatus for providing an object-based transport layer in network communications is provided that includes means for receiving one or more objects from an application for communicating to a remote network node and means for receiving metadata for the one or more objects from the application. The apparatus further includes means for providing the one or more objects to a network protocol layer for transmitting over at least one network interface related to a channel of a selected session based at least in part on a priority indicated in the metadata.

Still, in another aspect, a computer-program product is provided for providing an object-based transport layer in network communications that includes a computer-readable medium having code for causing at least one computer to obtain one or more objects from an application for communicating to a remote network node and code for causing the at least one computer to obtain metadata for the one or more objects from the application. The computer-readable medium further includes code for causing the at least one computer to determine a session for communicating the one or more objects to the remote network node. In addition, the computer-readable medium further includes code for causing the at least one computer to communicate the one or more objects to a network protocol layer for transmitting over at least one network interface related to a channel of the session based at least in part on a priority indicated in the metadata Moreover, in an aspect, an apparatus for providing an object-based transport layer in network communications is provided that includes an object receiving component for obtaining one or more objects from an application for communicating to a remote network node and an object properties associating component for receiving metadata for the one or more objects from the application. The apparatus further includes an object communicating component for providing the one or more objects to a network protocol layer for transmitting over at least one network interface related to a channel of a selected session based at least in part on a priority for the one or more objects indicated in the metadata.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
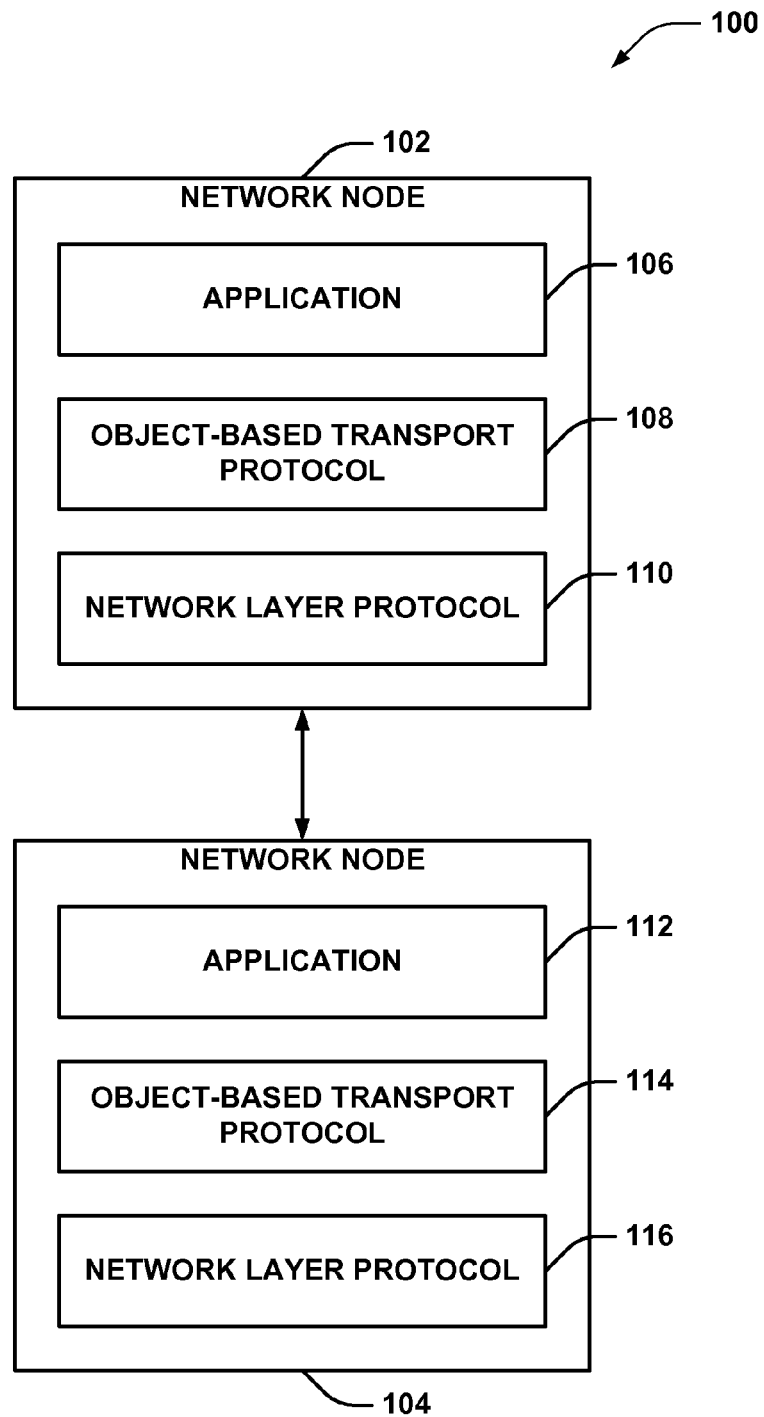
FIG. 1 illustrates an example system for facilitating network communications between nodes over multiple layers.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, an object-based transport protocol is provided that allows network nodes to prioritize communication of objects, associate deadlines for receiving the objects, manage multiple channels to other network nodes over which objects can be transmitted, and/or the like. In one example, the object-based transport protocol additionally defines one or more sessions that can each manage one or more of the multiple channels and communication of objects thereover. In this regard, the object-based transport protocol is an improvement over other transport protocols at least as it allows transmission of arbitrarily sized objects, an enforceable priority associated with the objects, a transmit deadline for the objects to avoid transmitting objects no longer needed, management of multiple connections transparent to upper layers (e.g., which provides mobility as well as possibly improved data rates from multiple connections), etc.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is an example system 100 that facilitates communicating between nodes in a network using an object-based transport protocol. System 100 comprises network nodes 102 and 104, which can be client and server nodes, respectively, in a network. For example, network nodes 102 and 104 can each be a mobile device, such as a UE, a computer, and/or substantially any node that can communicate in a wired or wireless network. Moreover, there can be additional nodes between network nodes 102 and 104 to facilitate communicating, such as one or more routers, gateways, firewalls, etc., and/or wireless network components, such as one or more base stations, relay nodes, etc. These components are not depicted for ease of explanation; however, network nodes 102 and 104, in this regard, can communicate in substantially any network technology and/or across multiple network technologies. In one example, network node 102 can simultaneously communicate with network node 104 through a 3GPP interface and a WiFi interface over different physical network connections with various components between the network nodes 102 and 104 to facilitate communicating across the multiple networks.

According to an example, network node 102 can include an application 106 that can leverage one or more host or media layer protocols to communicate with an application 112 at network node 104, and vice versa. For example, applications 106 and 112 can be applications, services, objects, widgets, or substantially any executable code at network nodes 102 and 104. In addition, network nodes 102 and 104 include object-based transport protocols 108 and 114 that can communicate objects from applications 106 and 112, respectively, over network layer protocols 110 and 116, respectively. In one example, network layer protocols 110 and 116 can utilize an IP or similar protocol. For example, application 106 can formulate a request for content from network node 104 (e.g., from application 112). In an example, application 106 can leverage an application programming interface (API), or similar interface offered by object-based transport protocol 108 to create one or more objects related to the request for content. In this regard, for example, application 106 can specify metadata to be associated with the request and/or the responding data, such as a priority, transmission deadline, response properties, one or more parameters regarding the object, and/or the like. Object-based transport protocol 108, in this example, can associate the metadata with one or more objects related to the request for content. Based at least in part on the metadata, object-based transport protocol 108 can select one or more channels over which to send the object comprising the request for content to network node 104.

As described, for example, object-based transport protocol 108 can manage multiple sessions that can each comprise one or more channels over one or more network interfaces to a given end host, such as network node 104. In addition, object-based transport protocol 108 can provide the object related to the request for content to an appropriate session for network node 104. In one example, object-based transport protocol 108 can provide the object once it is received in full, and can provide the object regardless of order (e.g., unless in-order delivery is requested by the application 112, as described below). The session in object-based transport protocol 108 for network node 102 can order objects according to priority in related metadata, and can leverage network layer protocol 110 for sending the object to network node 104. Thus, in an example, network node 104 can receive the object from network node 102 over network layer protocol 116 (e.g., in one or more packets or other network framed units created by network layer protocol 110). Network layer protocol 116 can provide the object (e.g., as the one or more packets) to object-based transport protocol 114. Object-based transport protocol 114 can reframe the object (e.g., where packets are received) and deliver the object to application 112 once received in full from network node 102. Thus, application 112 can process the object and determine the request for content in the object and the metadata associated therewith.

In an example, application 112 can fulfill the request for content, which can include communicating one or more response objects to network node 102, streaming the one or more response objects, and/or the like. In addition, application 112 can set a priority for the response objects, a transmission deadline for any potential response to the one or more response objects, other metadata for the response object, such as identifiers, etc. (which can be specified in the response properties of the request for content object) via object-based transport protocol 114. Similarly, in an example, application 112 can set response properties for the one or more response objects using the object-based transport protocol 114. As described above, object-based transport protocol 114 can provide the one or more response objects to one or more sessions for communicating to network node 102 over one or more channels according to a priority or other parameters specified in related metadata. In this example, as described, the one or more sessions can leverage network layer protocol 116 to communicate the one or more data objects (e.g., as one or more packets) to network node 102.

In addition, for example, object-based transport protocol 114 can determine a transmission deadline is reached for one or more objects before or during transmitting to network node 102 based at least in part on the metadata for the one or more objects. In this example, object-based transport protocol 114 can remove the one or more objects from related sessions, cease transmitting the one or more objects, and/or the like. In addition, application 106 can modify one or more properties related to response data of the request for content, such as priority. In this example, object-based transport protocol 108 can communicate a message to network node 104 via network layer protocol 110 to network layer protocol 116 to update object properties. Network layer protocol 116, as described, can provide the message to object-based transport protocol 114, and object-based transport protocol 114 can appropriately modify properties related to response data for the request for content. In this regard, for example, application 106 modifies the priority for the response data to affect transmission thereof.

Moreover, for example, object-based transport protocol 108 can cancel transmission of an object by communicating a cancel message to network node 104, as described. Similarly, object-based transport protocol 114 can cancel reception of an object by communicating a related message to network node 102. In addition, object-based transport protocol 114 can cancel transmission of an object to network node 102 based at least in part on passing of a related transmission deadline, as described. Moreover, where object-based transport protocol 108 receives two objects with the same data from network node 104 and another network node, object-based transport protocol 108 can merge the objects to accelerate reception. In yet another example, since objects can be stored at object-based transport protocol 114 during transmission, object-based transport protocol 108 can pause and resume transmission of objects from network node 104 or a related session (e.g., based at least in part on a request received from application 106) by issuing a corresponding message to object-based transport protocol 114. Moreover, object-based transport protocol 108 can instruct object-based transport protocol 114 to pause one or more sessions from transmitting objects.

Figure 2:
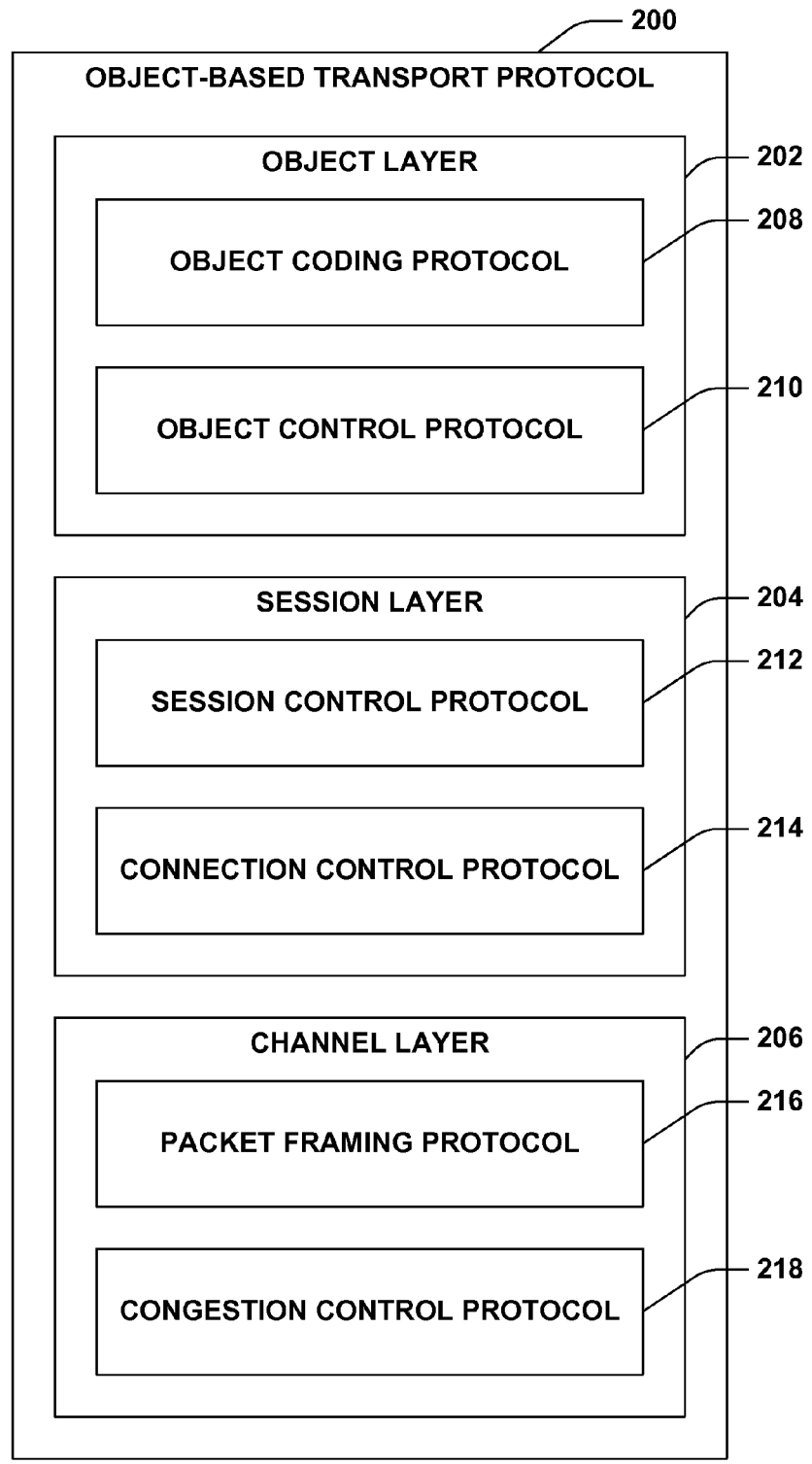
FIG. 2 illustrates an example object-based transport protocol for allowing communication of arbitrarily sized objects.

Turning to FIG. 2, an example object-based transport protocol 200 in accordance with aspects described herein is illustrated. For example, the object-based transport protocol 200 can be implemented within a network node (e.g., a client or server node), such as a UE, end computer, server, or substantially any node that can communicate in a wireless network. In addition, the object-based transport protocol 200 can be implemented to interface with other protocols within the network node (e.g., an IP protocol, or other network layer protocol, an application protocol, or other host or media layer protocols) to provide communications of objects between network nodes, as described herein. The object-based transport protocol 200 can include an object layer 202 that handles one or more objects to be communicated with a remote network node, a session layer 204 that establishes one or more sessions for communicating objects over one or more channels, and a channel layer 206 that maintains the one or more channels with the remote network node and/or one or more additional remote network nodes.

Moreover, for example, object layer 202 can comprise an object coding protocol 208 that encodes objects for transmitting to the remote network node (e.g., utilizing an erasure code or other encoding algorithm), and an object control protocol 210 that communicates metadata related to the objects, such as priority, deadline, and/or other parameters (e.g., identification information, etc.). In addition, session layer 204 can comprise a session control protocol 212 that establishes, maintains, and removes sessions for transmitting objects to the remote network node, adds/removes channels to/from a session, etc., and a connection control protocol 214 that maps the sessions to one or more channels, as described. Furthermore, channel layer 206 can comprise a packet framing protocol 216 that encapsulates the encoded objects into network layer packets for transmission over the one or more channels, and a congestion control protocol 218 that provides congestion control at each of the one or more channels to improve throughput thereof.

According to an example, an application layer or other upper host layer can utilize the object-based transport protocol 200 to communicate objects to a remote network node (e.g., through an API offered by object-based transport protocol 200 and/or the like). As described, for example, the object-based transport protocol 200 can allow the application or other upper host layer to at least one of prioritize the objects for communication to the remote network node and/or responding objects being communicated from the remote network node, associate and enforce a deadline for communicating objects to/from the remote network node, and/or the like. Thus, object layer 202 can maintain a state for each object to facilitate enforcing priority, storing partially received objects until a remaining portion of the object is received, and/or the like. In this example, object-based transport protocol 200 can receive objects (e.g., from an application), and object coding protocol 208 can encode the objects using one or more encoding algorithms, such as an erasure code, or other code to increase reliability of communicating the object, thus generating one or more forward error correction (FEC) symbols for the object.

In addition, object control protocol 210 can associate metadata, such as priority, transmission deadline, object tag or identifier, etc., with the objects, where the metadata can be at least one of received from the application or other upper host layer (e.g., through an API), specified by or otherwise negotiated with a receiver of the encoded object, and/or the like. In addition, for example, object layer 202 can create object coding protocol data units (PDU) from the FEC symbols that can include one or more headers related to the object layer 202. Moreover, for example, object layer 202 can provide the object coding PDUs (and/or metadata related to the corresponding objects) to session layer 204 for prioritized transmission.

In this example, session layer 204 can establish and maintain a session with the remote network node, as described. The session can comprise one or more channels over one or more network interfaces for communicating network layer packets to the remote network node. In addition, object coding PDUs from multiple applications can be provided to a session (e.g., by object layer 202) for communicating to the remote network node. In addition, session layer 204 can add and remove channels from given sessions, which can each correspond to a connection over an interface to the remote network node. In another example, session layer 204 can establish and maintain a security association with a remote network node that enables addition of one or more channels to the remote network node while verifying the remote network node is the same as for at least another channel in the session.

In this example, session layer 204 can include the security association when establishing additional channels with the remote network node, and the remote network node can verify the security association in determining whether to allow establishment of the channel.

Session control protocol 212 can thus establish, maintain, and remove sessions, add or remove channels to/from a session, and/or the like, for example. Connection control protocol 214 can establish and remove channels with one or more remote network nodes using one or more network interfaces connected to one or more hosts. In the above example, session layer 204 can associate the one or more object coding PDUs to the session established with the remote network node by session control protocol 212. For example, this can be based at least in part on an identifier associated with the remote network node that is specified with the object coding PDU (e.g., in the metadata, in a header associated with the encoded object, or otherwise). For a given session, for example, session control protocol 212 can order object coding PDUs in the session according to priority, transmission deadline, and/or other properties in the metadata associated with the object coding PDUs.

Session control protocol 212 can transmit the one or more object coding PDUs over one or more channels associated to the session by connection control protocol 214. In this regard, for example, session control protocol 212 can maintain a session while modifying channels of the session using connection control protocol 214 to maintain transparency of the session. Thus, one or more hosts can be modified in a communication path to the remote network node, and session control protocol 212 can update one or more channels of the session in view of the modification without exposing the modification to the application (e.g., or even to object layer 202). In one example, this can allow for mobility of a related network node.

Moreover, in this example, channel layer 206 can manage the one or more channels with the remote network node over one or more network interfaces. Channel layer 206 can handle congestion control, packet framing, network address translation (NAT) and firewall traversal, and/or the like for the one or more channels. For example, packet framing protocol 216 can convert the one or more object coding PDUs into one or more packets (e.g., and/or PDUs) for transmission over a channel (e.g., using one or more network layer protocols). Congestion control protocol 218 can determine whether the channel can handle transmitting at least a portion of the one or more packets according to the congestion control process. Congestion control, for example, can refer to the ability of a channel to control flow of communication over a related interface so as not to overload the interface, and a congestion control process can provide such functionality at a related channel. Channel layer 206 can then provide the one or more packets to the network layer protocol for transmission to the remote network node. In one example, the channel layer 206 can utilize transmission control protocol (TCP) to accomplish the packet framing, congestion control, etc.

Similarly, for example, channel layer 206 can receive one or more packets from the remote network node (e.g., in response to the object sent thereto) over a network interface. Packet framing protocol 216 can translate the one or more packets into one or more object coding PDUs (e.g., using a similar framing as for the transmitted packets), and provide the object coding PDUs to session layer 204 over the channel related to the network interface and the remote network node. Connection control protocol 214 can obtain the object coding PDUs, and session control protocol 212 can associate the object coding PDUs a session (e.g., based on the channel over which the packets are received). Session layer 204 can communicate the object coding PDUs to the object layer 202. Object coding protocol 208 can decode the object coding PDUs according to the encoding utilized, for example, and can provide the decoded object to a related application layer (e.g., an application related to the session). The foregoing allows for various advantages over current transport protocols. For example, application layers are provided some control over framing data. For example, creating the object that will be transmitted over the object-based transport protocol 200 allows application layers to create arbitrarily sized objects (e.g., objects that vary in size), further specify parameters for communicating the object, such as priority and expiration timer, etc., as described.

Figure 3:
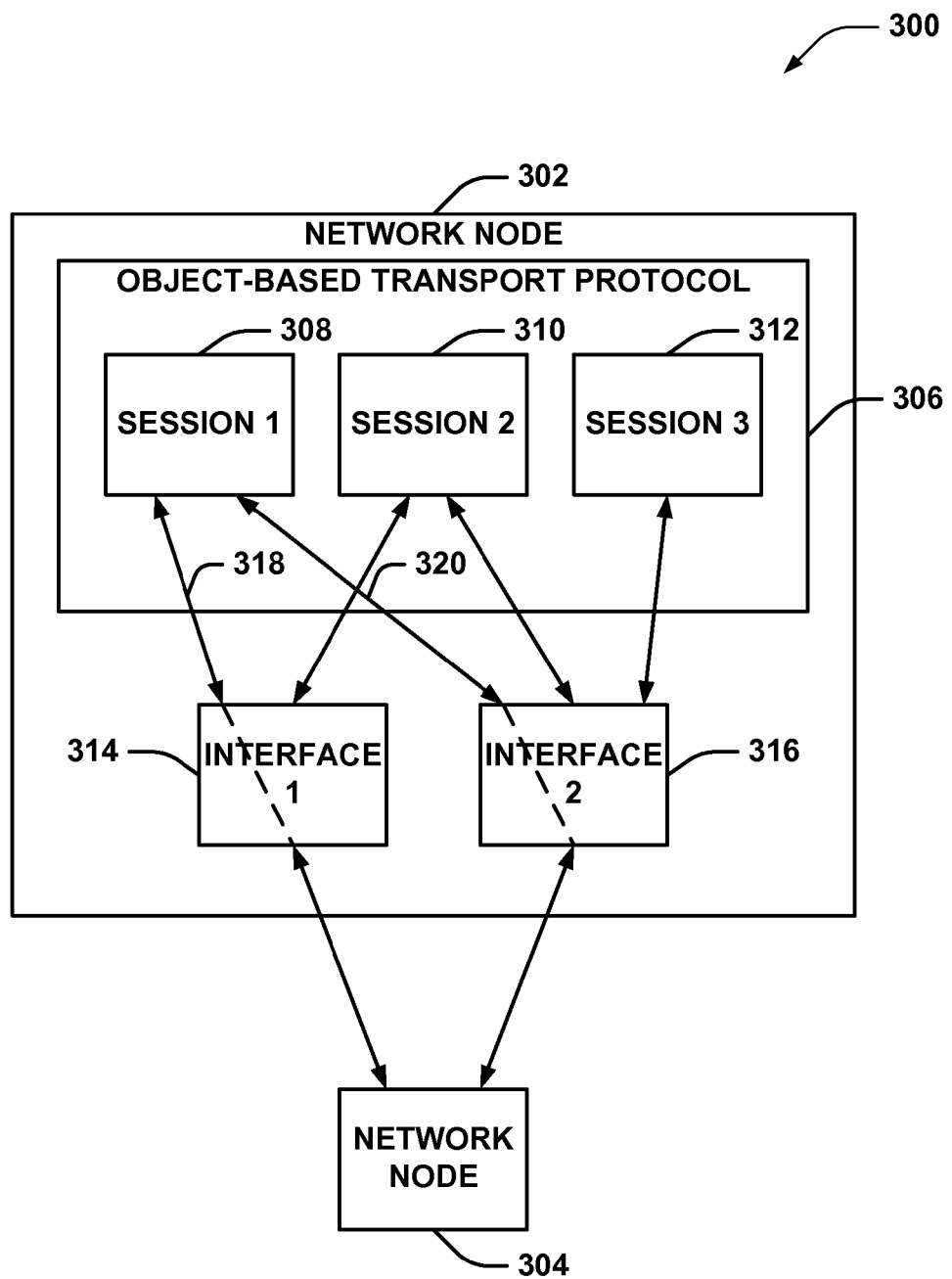
FIG. 3 illustrates an example system for communicating objects over one or more sessions of an object-based transport protocol.

Referring to FIG. 3, an example communication system 300 is shown that facilitates providing an object-based transport protocol 306 for communicating objects over a network. System 300 comprises network nodes 302 and 304 that communicate with one another in a wired or wireless network. Though not shown, network nodes 302 and 304 can communicate through one or more additional network nodes, such as one or more gateways, routers, base stations, other devices, and/or the like. Moreover, the network nodes 302 and 304 can each be substantially any network node or endpoint, such as a UE, computer, server, etc. Network node 302 can include an object-based transport protocol 306, as described herein, to communicate with network node 304 (which can also have an object-based transport protocol—not shown).

Object-based transport protocol 306 can include, for example, a plurality of sessions 308, 310, and 312 that utilize one or more network interfaces 314 and 316 of network node 302 to communicate with network node 304. As described, for example, object-based transport protocol 306 can establish session 1 308 for communicating with network node 304. In addition, object-based transport protocol 306 can establish session 2 310 and session 3 312 for communicating with other network nodes (not shown), over one or more of the network interfaces 314 and 316. Moreover, as shown, session 1 308 and session 2 310 can utilize interface 1 314 and interface 2 316 over channels 318 and 320, respectively, for communicating with network nodes, whereas session 3 312 has a channel to interface 2 316 and not interface 1 314. It is to be appreciated that complete meshing is possible, in one example, such that all sessions can have channels over all interfaces. In addition, each session 308, 310, and 312 can order objects within the session according to priority indicated in metadata for the objects.

In addition, interface 1 314 and interface 2 316 can be substantially any network interface, such as a 3GPP interface, WiFi interface, WiMAX interface, LTE interface, local area network (LAN) interface, and/or the like. As described, for example, object-based transport protocol 306 can receive one or more objects from an application for transmitting over the one or more sessions 308, 310, or 312. For example, the application can identify network node 304 to receive the object, and object-based transport protocol 306 can associate the object with session 1 308 based at least in part on identifying network node 304 as associated with session 1 308. Thus, object-based transport protocol 306 can place the object in session 1 308 for transmission (e.g., following encoding the object, associating metadata with the object, and/or the like, as described).

Object-based transport protocol 306 can transmit the object according to determining an interface sending opportunity at interface 1 314 and/or interface 2 316. For example, interface 1 314 and interface 2 316 can have queues for outgoing packets, which can be managed to ensure the interfaces are not overloaded. Thus, when interface 1 314 and/or interface 2 316 has room in its buffer for a maximum transmission unit (MTU) of data, the interface has a sending opportunity. Each channel, such as channels 318 and 320, can maintain congestion control, as described. Thus, when an interface sending opportunity occurs at an interface related to a channel (e.g., interface 1 314 for channel 318 or interface 2 316 for channel 320), each channel can determine whether it can send data in accordance with its congestion control process. Based at least in part on this information, a subset of sessions 308, 310, and 312 can be determined as eligible for sending. For example, if interface 1 314 has an interface sending opportunity, session 1 308 and session 2 310 can be identified, in one example, as being eligible for sending.

In addition, however, object-based transport protocol 306 can place one or more sessions on hold. This can be initiated by network node 304, for example, where network node 304 prefers another session with another network node. For example, network node 302 can provide streaming data to network node 304, but network node 304 can switch from the streaming application to another application with another network node. In this case, network node 304 may wish to place session 1 308 on hold so as not to receive data therefrom for at least a period of time. In this example, object-based transport protocol 306 can consider a state of the sessions when determining whether the sessions are eligible for sending. Thus, in the example above, object-based transport protocol 306 can determine session 2 310 as eligible for sending where session 1 308 is indicated as being in an on hold state.

In this example, once object-based transport protocol 306 identifies the subset of sessions eligible for sending (e.g., session 1 308 and session 2 310 in this example), a session with the highest priority object among those eligible (e.g., whose transmission deadline has not passed) according to the metadata related to the object can utilize the interface sending opportunity. In this regard, for example, a unique object, session, and interface combination can be identified, and data for the object can be sent through the interface. Where two or more eligible sessions have objects of the same or similar priority, for example, additional information can be analyzed to determine which session can utilize the interface sending opportunity (e.g., a last session that was unable to use a interface sending opportunity, a session with an earlier last transmission time, and/or the like).

In addition, for example, where the size of the object selected for transmission over the interface sending opportunity is smaller than an available MTU at the interface for the interface sending opportunity, the session (e.g., session 1 308) from which the object is selected can transmit a portion of one or more additional objects in the interface sending opportunity. In another example, another session with a different object of higher priority than the one or more additional objects, such as session 310, can transmit the different object during the interface sending opportunity. In one example, any reference to sending or transmitting an object herein can include the foregoing process of determining sessions eligible during given interface sending opportunities and selecting a highest priority object from one or more of the sessions.

In one example, object-based transport protocol 306 can provide a sending opportunity or instructions to transmit to session 1 308, as described. In this example, object-based transport protocol 306 can include an allowed size for transmitting over the related interface (e.g., interface 1 314), an estimated round trip time for the related channel (e.g., channel 318), and/or the like. In an example, session 1 308 can deny the sending opportunity, in which case object-based transport protocol 306 can offer the sending opportunity to a session with the next highest priority object such as session 2 310. In another example, session 1 308 and session 2 310 can deny the sending opportunity. In this example, session 1 308 and/or session 2 310 can request the sending opportunity within object-based transport protocol 306 when needed to transmit data to network node 304 (e.g., where object-based transport protocol 306 provides additional objects to session 1 308 or session 2 310, where object-based transport protocol 306 indicates to resume a session previously placed on hold—e.g., at the request of network node 304—and/or the like).

In addition, network node 304 can include an object-based transport protocol that implements one or more sessions and/or channels to one or more interfaces for communicating with network node 302, as described. In this example, network node 304 can transmit response objects to network node 302 by utilizing a connection with interface 1 314 or interface 2 316, which can accordingly forward the response objects to session 1 308. In addition, as described above and further herein, object-based transport protocol 306 can control one or more aspects of communication of response objects from network node 304 (e.g., using response data parameters in the corresponding request, sending commands to network node regarding modifying parameters for the response objects, and/or the like).

In one example, as described herein, referring back to FIG. 1, the network nodes 102 and 104 can be referred to as end points, Object Transport (OT) Service Access Points (SAP), etc. For example, an Object Transport Service Access Point is a logical point at which an application accesses the Object Transport service. For example, there can be multiple types of OT Service Access Point. A Connectionless OT SAP sends objects to and receives objects from arbitrary remote Connectionless OT SAPs. A Connection Oriented OT SAP sends objects to and receives objects from a specific remote Connection Oriented OT SAP. This type of SAP can also be used to receive requests from a remote Connection Oriented OT SAP for establishment of a new local Connection Oriented OT SAP. A Multicast OT SAP sends objects to and receives objects from an IP Multicast group.

Moreover, in a specific example implementation, an OT Endpoint addresses a potential OT Service Access Point and is identified by a (Host Identity, OT Port) pair, where Host Identity is an identifier for an end host (e.g., a Host Identity according to a Host Identity Protocol (HIP)) and OT Port is an identifier for the OT Endpoint within that host. For example, an HIP can be a host identification technology used in an IP network to differentiate between an end-point identifier and locator. An OT Locator can be a network layer address (e.g., IP address) for an OT host. An OT Locator can be used to initiate communication with an OT Endpoint. The purpose of connection-oriented SAPs, for example, is to provide applications, such as applications 106 and/or 112, with a context in which related objects can be handled. This can be useful when security is required by object-based transport protocols 108 and/or 114 as the security association can be created at the socket level and applies to the objects exchanged through that connection. For example, sockets can be utilized to communicate between network nodes, where the socket can be a TCP socket. Two modes of connection establishment can be provided in this example: a normal mode where a connection is established immediately upon request; and a lazy mode where connection establishment is delayed until data is to be sent. This allows data exchange and connection establishment to take place concurrently and can avoids the connection setup delay before data can be transferred.

Additionally, for example, the object properties, as described previously (e.g., priority, transmission deadline, etc.) can be defined as follows in one specific example implementation.

Priority: Object priority is a hint to the Object Transport layer about the relative priority of the object. Resources for a session can be allocated to higher priority objects before being allocated to lower priority objects. Priority levels are defined in the following table:

| Priority | Index | Description |
| --- | --- | --- |
| URGENT | 0 | Reserved for objects that are required to generate a user interface response to a user action |
| EXPEDITE | 1 | Fast transfer of the object is required to ensure good operation the application but not at the cost of user interface (UI) responsiveness. |
| STANDARD | 2 | Normal priority for foreground traffic |
| BACKGROUND | 3 | Transfer of the object was initiated asynchronously and should continue in background when the link is not required for other traffic. |

Deadline: This is a deadline in time after which the object is no longer useful to the receiver. After this time no further attempts will be made to deliver the object. This can also be referred to herein as a transmission deadline.

Response properties: This is a set of properties that the sender of an object would like the receiver of the object to use for returning any response. This allows the sender to express an opinion about what priority should be used for the response and whether there is a deadline after which the response will not be useful.

In addition, in one example implementation, to assist applications in identifying objects in advance of complete reception of the object, the object-based transport protocol 108 and 114 in FIG. 1 and object-based transport protocol 306 in FIG. 3 can allow applications to associate an object tag to each object. The object tag is an opaque data field which is transported together with the object. The object tag for an object in transit is available to the receiver immediately for identifying the object as the object begins to arrive.

Moreover, for example, object-based transport protocol 108 and 114 in FIG. 1 and object-based transport protocol 306 in FIG. 3 can provide basic send and receive operations which operate at the level of objects as well as cancelling the sending or reception of an object. Object sending can be asynchronous whereas reception can be synchronous or asynchronous. In the asynchronous case, an event notification mechanism is provided to notify the user of the following events: a new object begins to arrive; a new object has been completely received; an object has been successfully delivered; transport of an object has been cancelled by the sender; an object deadline expired before it was received; and/or an object has been aborted due to insufficient memory at the receiver.

Referring back to FIG. 2, the following is one specific implementation for the object-based transport protocol 200. As described, a plurality of network nodes can each comprise an object-based transport protocol and can communicate with each other using the object-based transport protocol. In the below description, a sender can be a network node that transmits objects to a receiver (another network node) using the object-based transport protocol.

In an example, the object coding protocol 208 can be implemented according to the following aspects. For example, an object coding PDU, as described above, can comprise both object information and feedback information, possibly for multiple objects. Object information can be carried in an object block and feedback information in a feedback block of the object coding PDU. In addition, object coding protocol 208 can identify objects by unsigned integer object identifiers allocated by each network node, which can be communicated in object metadata. When object sending begins between network nodes, for example, the sender includes the local object identifier that it has allocated. Once the sender has exchanged object control protocol 210 messages with the receiver then the sender has access to the receiver's identifier for the object, which can then be used in object data packets. The use of the receiver's object identifier can simplify object lookup at the receiver. Object information such as object tag, properties, FEC object transmission information (e.g., object size), and the association with the object identifier can be communicated by the object control protocol 210 to an object-based transport protocol at the receiver. It is possible, in one example, that object reception can begin at the receiver before this object information is received.

In addition, object control protocol 210 can allow for communication of feedback between a sender and receiver. Feedback provides the sender with information about the progress of reception of an object at the receiver. This information can be used to determine when and how much additional data should be sent for an object. For small objects, for example, it can be desirable that feedback can be sent before the object information is received from the object control protocol 210. For this reason, a symbol size can be coded within the object block of one or more object coding PDUs, so that a count of received symbols can be made before receiving the FEC Object Transmission Information. This count can then be reported in the feedback. For large objects, for example, feedback can be communicated when reception of the object is nearly completed. For this reason, once the FEC object transmission information is received (and the object size is known), a remaining number of symbols required can be reported.

According to one example, the object coding PDU format can be defined as shown below. To support application layer framing, two message formats are defined: ObjectCodingHeader and ObjectCodingBody. An object coding PDU can include a ObjectCodingHeader message followed by zero or more ObjectCodingBody messages

```
message ObjectCodingFeedback
{
    required uint32 remote_object_identifier = 1;
    optional uint64 required_symbol_count = 2;
    optional uint64 received_symbol_count = 3;
}
message ObjectCodingHeader
{
    repeated ObjectCodingFeedback feedback = 1;
}
message ObjectCodingBody
{
    optional uint32 local_object_identifier = 1;
    optional uint32 remote_object_identifier = 2;
    optional uint32 symbol_size = 3;
    required uint32 encoding_symbol_id = 5;
    required bytes symbols = 32;
}
```

For each object to be sent, the object control protocol 210 at the sender can maintain a count of outstanding symbols, representing the number of symbols that remain to be sent for the object, $N_{send}$, and the time at which data was last sent for the object, $T_{send}$. Objects to be sent are sorted in priority order within a session (e.g., by session layer 204, as described above). Objects of equal priority can be sorted in reverse order of the last transmission time for the object (e.g., with the least recently transmitted object first). For each object being received, the object control protocol 210 at the receiver can maintain a count of the number of received symbols, $N_{recv}$, the time at which data was last received, $T_{recv}$, the time at which feedback was last sent for the object, $T_{feedback}$, the number of required symbols indicated in the last feedback, $N_{feedback}$, and/or the like.

For example, when a new object is provided for transmission by an application, object control protocol 210 can insert the object into the object ordering according to its priority. When notified of a sending opportunity for a session, the object coding protocol 208 can first identify whether feedback should be sent, which can be based at least in part on one or more of the following determinations: the object is complete and either no feedback indicating completion has been sent or feedback has been sent for a round trip time and data has been received for the object in the last round trip time; the object is not complete and a round trip time has elapsed since feedback was last sent; or the object is not complete, data has been received for an object of lower priority since feedback was last sent and no feedback has been triggered by this rule for a round trip time. Where feedback is to be included for an object, the number of remaining symbols for this object can be included in the object coding PDU, if known. Where the number of remaining symbols for an object is not known because the FEC object transmission information has not been received then the number of received symbols can be included.

The sender then identifies the first object to be sent with $N_{send}\mathord{!}=0$ and adds a number of symbols to the object coding PDU equal to the lesser of $N_{send}$ and the maximum number of symbols that will fit in the object coding PDU. $N_{send}$ can be decremented by the number of symbols included in the PDU. If space remains in the object coding PDU then the procedure can be repeated for the next object with $N_{send}>0$. For each object that has $N_{send}=0$, the sender can maintain a timer from the time at which the last symbol was sent for this object ($T_{send}$). If this timer expires then the number of outstanding symbols for the object can be increased.

On receipt of an object coding PDU, the receiver first processes the feedback messages, if any, from the feedback block of the object coding PDU. For each feedback message the receiver can update the value of $N_{send}$ for the object based on the received feedback information. The receiver then processes the object block or the object coding PDU. For each entry the receiver can identify the object based on the object identifier. If the object identifier is unknown, a new object can created. The receiver stores the received symbols (e.g., in a memory or data store) in association with the object and identifies whether sufficient information has been received to recover the object.

Moreover, for example, the object control protocol 210 can communicate metadata regarding one or more objects to/from a disparate object control protocol of a remote network node to control delivery of one or more objects. For example, the object metadata can include: object ID, object tag, FEC object transmission information (e.g., including object size), object properties, and/or the like. For example, the object ID can be a local identity of the object according to an unsigned integer, as described previously, the object tag can be an identifier generated by the sender, the FEC object transmission information can include details regarding receiving the FEC related to the object coding PDU, and the object properties can include priority, transmission deadline, etc. The object control protocol 210, for example, can have one message type which proposes values for some or all of the data items associated with an object. When the values in a received message match the last proposed values, for example, exchange of messages can cease, otherwise exchange of messages can continue until the sender and receiver reach agreement on the data values.

In addition, for example, the messages can be idempotent, meaning that repeated receipt of the same message can have the same or similar effect as the message being received once. Moreover, the message can be atomic such that either all or none of the state changes proposed in a message are enacted. Moreover, each message can be targeted at a single object. The instance can be identified by local and remote object IDs. The remote object ID is not provided in the first message sent for a given instance (this message establishes the state instance at the remote peer). In addition, messages can carry a sequence number and out of order messages are silently discarded. There is a separate sequence number space for each object instance. Each network node can retain the sequence number of the earliest message sent containing the current desired state. Furthermore repeated messages can be sent whenever the desired state has not been confirmed by a network node. Also, to identify race conditions, the highest sequence number received from the remote peer can be echoed in every message sent. To resolve race conditions one node is designated as having a master token.

In one example, an object control PDU can be implemented as follows:

```
message FecObjectTransmissionInformation
{
    required uint64 transfer_length = 1;
    required uint32 symbol_size = 2;
    required uint32 sub_block_count = 4;
    required uint32 alignment = 5;
}
message ObjectProperties
{
    enum Priority
    {
        URGENT = 0;
        EXPEDITE = 1;
        STANDARD = 2;
        BACKGROUND = 3;
    }
    optional Priority priority = 1;
    optional uint32 deadline = 2;
    optional ObjectProperties response_properties = 3;
}
message ObjectControl
{
    optional uint32 local_object_identifier = 1;
    optional uint32 remote_object_identifier = 2;
    required uint32 local_sequence = 3;
    optional uint32 remote_sequence = 4;
    optional uint32 otport = 5;
    optional uint32 local_connection_identifier = 6;
    optional uint32 remote_connection_identifier = 7;
    optional uint32 object_sequence_number = 8;
    optional FecObjectTransmissionInformation fec_oti = 16;
    optional bytes object_tag = 17;
    required ObjectProperties properties = 32;
}
```

The elements of the FecObjectTransmissionInformation message can be defined in a RaptorG or similar specification.
The object properties are defined as follows:
priority is one of the values URGENT, EXPEDITE, STANDARD, BACKGROUND
deadline is a non-negative integer giving the deadline for object reception in milliseconds counting from the sending/reception of the first packet of the object.

The fields of the ObjectControl message are defined as follows:

local_object_identifier is a non-negative integer that identifies the object allocated by the sender of the message. This can be included in all messages sent by an endpoint until it receives a message from the peer containing the remote_object_identifier field echoing the object identifier value.

remote_object_identifier is a non-negative integer that identifies the object allocated by the receiver of the message. This can be included in all messages sent subsequent to the receipt of any message from the remote peer.

local_sequence is a sequence number for this message allocated by the sender of the message. The first message sent for a given object has local_sequence zero, the second has local_sequence one, etc.

remote_sequence contains the highest local_sequence number received from the peer node, or is omitted of no messages have been received from the peer.

otport contains the OT Port number to which the object is directed for objects sent over connectionless sockets. It can be included in all messages which do not include a remote_object_identifier.

local_connection_identifier contains a local identifier for a new connection remote_connection_identifier contains the connection identifier allocated by the remote endpoint for the connection object_sequence_number contains the sequence number, starting from zero, for the object for connections with in-order delivery fec_oti contains the FEC Object Transmission Information as defined for RaptorG except that the number of source blocks may not be signaled and can be assumed to be one. It can be included in all messages which do not include a remote_object_identifier.

object_tag contains the object tag provided by the sending application properties contains proposed object property values.

For each object, the object control protocol 210 can maintain the following state information:

| Object state element | Description |
| --- | --- |
| Local Object Identifier | A unique local identifier for the object |
| Remote Object Identifier | The remote peer's unique identifier for the object |
| Current properties | Current object properties as confirmed by the peer, or null if no properties have been confirmed. |
| Confirmation flag | True if a confirmation of the current properties is required, false otherwise |
| Desired properties | Object properties as proposed to the peer, or null if there is no outstanding unconfirmed proposal. |
| Proposal send time | The timestamp at which the last message containing the current desired properties value was sent, or null if no message has been sent containing the current desired properties. |
| Last Local Sequence Number | The Object Control PDU local sequence number of the last message sent, or null if no message has been sent. |
| Last Remote Sequence Number | The Object Control PDU local sequence number of the last message received, or null if no message has been received. |

In one example, a general principle of object control protocol 210 operation can be that either peer can at any time propose a new set of object properties. A peer receiving a new proposal can reply confirming the proposal, or reply with a counter-proposal, for example. Message exchange can continues until the peers agree on a set of properties.

On creation of a new object, the object state information can be initialized as shown below:

| Object state element | Initial value |
| --- | --- |
| Local Object Identifier | <A new unique local identifier for the object> |
| Remote Object Identifier | Null |
| Current properties | Null |
| Confirmation flag | False |
| Desired properties | The initial object properties |
| Proposal send time | Null |
| Last Local Sequence Number | Null |
| Last Remote Sequence Number | Null |

On local change of properties at the sender or receiver, the Desired properties can be set to the new property values and the proposed send time can be set to Null. On a sending opportunity, a message for changing properties can be sent to a remote network node if at least one following condition holds: the Desired properties is not Null and either the Proposal send time is Null, or the current time is greater than the Proposal sent time plus twice the Round trip time; or the conformation flag is true. If a message is to be sent, the message fields can be set by object control protocol 210 as follows:

The local object identifier field can be set to the Local Object Identifier value.

The remote object identifier field can be set to the Remote Object Identifier value, or omitted if that value is Null.

If the Last Local Sequence number is Null it can be set to zero. Otherwise the Last Local Sequence Number can be incremented by one.

The local sequence number field can be set to the Last Local Sequence Number

The remote sequence number field can be set to the Last Remote Sequence Number value, or can be omitted if that value if Null.

If the Last Remote Sequence Number is Null, then the following procedures can be followed The fec_oti field can be set to the FEC Object Transmission Information The object_tag field can contain the Object Tag provided by the sending application For connectionless sockets, the otport field can be set to the destination OT Port for the object For connection-oriented sockets, if the remote connection identifier is known then the remote_connection_identifier field can be included, otherwise the local_connection_identifier field can be included For connection_oriented sockets with in-order deliver, the object_sequence_number can be included.

The properties field can be set to the Desired properties value if this is not Null and otherwise to the Current properties value.

On receipt of an object control protocol 210 message the receiver can first identify the target object. If the message contains a remote object identifier field, this can be used to directly look up the object. If an object with this identifier does not exist the message can be silently discarded. Otherwise the message can be processed as described. If the message does not contain a remote object identifier, then the node can search for any objects with Remote Object Identifier value equal to the local object identifier field of the message.

If such an object is found, the message can be processed as described. If no such object is found then a new object can be created with state values initialized as follows:

| Object state element | Initial value |
| --- | --- |
| Local Object Identifier | <A new unique local identifier for the object> |
| Remote Object Identifier | The value of the local object identifier field from the received message |
| Current properties | The value of the properties field from the received message |
| Confirmation flag | True |
| Desired properties | Null |
| Proposal send time | Null |
| Last Local Sequence Number | Null |
| Last Remote Sequence Number | The value of the local sequence number field from the received message |

If the local sequence number field of the received message is less than or equal to the Last Remote Sequence Number value then the message can be silently discarded. Otherwise the Last Remote Sequence Number can be set equal to the local sequence number field. If the remote sequence number field of the received message is less than the Last Local Sequence Number value and this is the sending node then the message can be silently discarded. Furthermore, if the Desired properties is not Null and the properties field of the message matches the Desired properties value then the Current properties can be set to the Desired properties value, the Desired properties can be set to Null and the confirmation flag shall be set to true. Otherwise, the node can determine if the proposed properties are acceptable. If so, the Current properties can be set to the properties field, the Desired properties can be set to Null and the Confirmation Flag can be set to true. If the proposed properties are not acceptable, the node can determine the closest properties values that are acceptable. The Desired properties can be set to this value and the Proposal sent time shall be set to Null.

Moreover, for example, session control protocol 212, in one example, can be implemented according to the following aspects. Session Establishment can be achieved by a host identity protocol basic exchange. As a result of this exchange, the host identities of both network nodes of the session are established and keying material is generated. The initial establishment of the session implicitly validates the channel over which the session establishment took place. New channels can be added to or removed from the session using the host identity protocol UPDATE procedure.

In addition, for example, connection control protocol 214 can be implemented similarly to the object control protocol 210, and in one example, the object control protocol 210 can be implemented to include connection establishment and management in place of a connection control protocol 214. In one example, the connection control protocol 214 can additionally or alternatively include the following aspects.

The Connection Control PDU can be defined as follows:

```
message ConnectionControl
{
    enum ConnectionState
    {
        OPEN = 1;
        CLOSED = 2;
        REJECTED = 5;
    }
    required uint32 local_connection_identifier = 1;
    optional uint32 remote_connection_identifier = 2;
    optional uint32 local_sequence = 3;
    optional uint32 remote_sequence = 4;
    optional ConnectionState state = 3;
    optional uint32 otport = 8;
    optional bool in_order_delivery = 9;
}
```

Moreover, The fields of the ConnectionControl message can be defined as follows:

local_connection_identifier is a non-negative integer that identifies the connection allocated by the sender of the message. This can be included in all messages sent by an endpoint until it receives a message from the peer containing the remote_connection_identifier field echoing the connection identifier value.

remote_connection_identifier is a non-negative integer that identifies the connection allocated by the receiver of the message. This can be included in all messages sent subsequent to the receipt of any message from the remote peer.

local_sequence is a sequence number for this message allocated by the sender of the message. The first message sent for a given object has local_sequence zero, the second has local_sequence one etc.

remote_sequence contains the highest_sequence number received from the peer node, or is omitted if no messages have been received from the peer.

otport contains the OT Port number to which the connection is directed. It can be included in all messages which do not include a remote_connection_identifier.

in_order_delivery indicates whether the connection provides in-order delivery of objects.

For each object, for example, the connection control protocol 214 can maintain the following state information:

| Object state element | Description |
| --- | --- |
| Local Connection Identifier | A unique local identifier for the connection |
| Remote Connection Identifier | The remote peer's unique identifier for the connection |
| Current state | Current connection state (NEW | OPEN | CLOSED | REJECTED) |
| Confirmation flag | True if a confirmation of the current state is required, false otherwise |
| Desired state | Connection state as proposed to the peer, or Null if there is no outstanding unconfirmed proposal. |
| Proposal send time | The timestamp at which the last message containing the current desired state was sent, or null if no message has been sent containing the current desired state. |
| Last Local Sequence Number | The Connection Control PDU local sequence number of the last message sent, or null if no message has been sent. |
| Last Remote Sequence Number | The Connection Control PDU local sequence number of the last message received, or null if no message has been received. |

The general principle of connection control protocol 214 operation can be that either network node can at any time propose a new connection state. A network node receiving a new proposal can reply confirming the proposal, or reply with a counter-proposal. Message exchange continues until the network nodes agree on the new state, as with the properties messages exchange with object control protocols 210.

On creation of a new connection at the initiating endpoint, the connection state information can be initialized as shown below:

| Connection state element | Initial value |
| --- | --- |
| Local Connection Identifier | <A new unique local identifier for the connection> |
| Remote Connection Identifier | Null |
| Current state | NEW |
| Confirmation flag | False |
| Desired state | OPEN |
| Proposal send time | Null |
| Last Local Sequence Number | Null |
| Last Remote Sequence Number | Null |

On local change of state (e.g., connection closed), the Desired state can be set to the new state and the Proposed send time can be set to Null. On a sending opportunity, a message can be sent by a network node to another network node if at least one following condition hold: the Desired state is not Null and either the Proposal send time is Null, or the current time is greater than the Proposal sent time plus twice the Round trip time; or the Conformation Flag is true. If a message is to be sent, the message fields can be set as follows:

- The local connection identifier field can be set to the Local Connection Identifier value.
- The remote connection identifier field can be set to the Remote Connection Identifier value, or omitted if that value is Null.
- If the Last Local Sequence number is Null it can be set to zero. Otherwise the Last Local Sequence Number can be incremented by one.
- The local sequence number field can be set to the Last Local Sequence Number.
- The remote sequence number field can be set to the Last Remote Sequence Number value, or can be omitted if that value if Null.
- If the Last Remote Sequence Number is Null, then the following procedures can be followed
  - The otport field can be set to the destination OT port for the connection.
  - The in_order_delivery field can be set to true if and only if in order delivery is required for this connection.
- The state field can be set to the Desired state value if this is not Null and otherwise to the Current State value.

On receipt of a Connection Control message the receiver network node can first identify the target connection. If the message contains a remote connection identifier field, this can be used to directly look up the connection. If a connection with this identifier does not exist the message can be silently discarded. Otherwise the message can be processed. If the message does not contain a remote connection identifier, then the node can search for any connections with Remote Connection Identifier value equal to the local connection identifier field of the message. If such a connection is found, the message can be processed. If no such connection is found then a new connection can be created with state values initialized as follows:

| Connection state element | Initial value |
| --- | --- |
| Local Connection Identifier | <A new unique local identifier for the connection> |
| Remote Connection Identifier | The value of the local connection identifier field from the received message |
| Current state | The value of the state field from the received message |
| Confirmation flag | True |
| Desired state | Null |
| Proposal send time | Null |
| Last Local Sequence Number | Null |
| Last Remote Sequence Number | The value of the local sequence number field from the received message |

If the local sequence number field of the received message is less than or equal to the Last Remote Sequence Number value then the message can be silently discarded. Otherwise the Last Remote Sequence Number can be set equal to the local sequence number field. If the remote sequence number field of the received message is less than the Last Local Sequence Number value and this network node is not the initiating network node for the connection, the message can be silently discarded. If the Desired state is not Null and the state field of the message matches the Desired state value, the Current state can be set to the Desired state value, the Desired state can be set to Null and the Confirmation flag can be set to true. Otherwise, the network node can determine if the proposed state is acceptable. A state of CLOSED or REJECTED can always be accepted by the network node. If so, the Current state can be set to the state field, the Desired state can be set to Null and the Confirmation flag can be set to true. If the proposed state is not acceptable, the node can specify a state value that is acceptable, such as REJECTED in response to a request for the OPEN state. The Desired state can be set to this value and the Proposal sent time can be set to Null.

Moreover, according to an example, the packet framing protocol 216 can be implemented to include the multiple PDUs of other layers (e.g., object coding PDU, object control PDU, connection control PDU, and/or the like) in a packet for transmitting between network nodes. In addition, packet framing protocol 216 can add one or more headers to the packet, such as a host identity protocol header. In this regard, a packet framing protocol 216 at the remote network node can determine the various PDUs based at least in part on the packet framing, and object coding protocol 208, object control protocol 210, connection control protocol 214, etc. at the remote node can be utilized to process the PDUs.

Figure 4:
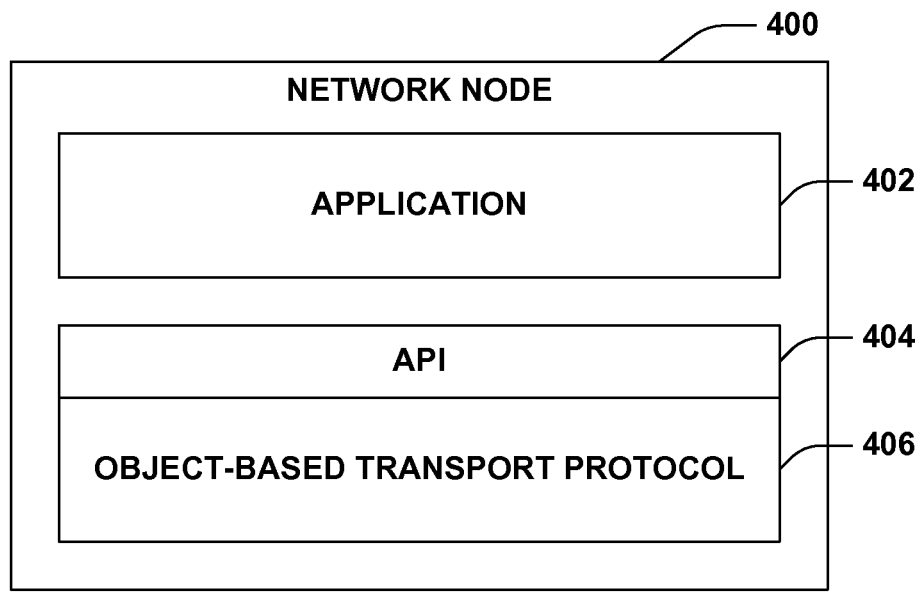
FIG. 4 illustrates an example network node with an application that leverages an object-based transport protocol via an application programming interface (API).

Turning to FIG. 4, an example network node 400 is depicted that facilitates utilizing an object-based transport protocol for communicating with one or more network nodes. As described, network node 400 can be substantially any node that communicates in a network, such as a device, UE, computer, server, any node or network node mentioned herein, and/or the like. Network node 400 can comprise an application 402 that executes and communicates with an application executing at a disparate network node, as described. Moreover, network node 400 can comprise an API 404 and a corresponding object-based transport protocol 406. For example, the API 404 can facilitate accessing the object-based transport protocol 406 by application 402.

According to an example, API 404 can allow application 402 (or one or more disparate applications) to create one or more arbitrarily sized objects for transmitting over a network, specify properties for the objects, control aspects of communicating the objects, and/or the like. In addition, API 404 can allow application 402 to specify parameters for connecting to a remote network node over a network (e.g., using a socket), and/or the like. Thus, application 402 can implement function calls to the API 404 to utilize the object-based transport protocol 406 to transport application layer objects to the remote network node.

In one example, the API 404 can have an implementation corresponding to the following aspects. The API 404 can include multiple APIs, including a data structures API for specifying a remote network node (also referred to herein as an endpoint), properties for an object, etc., a socket API for managing a connection with the remote network node, and an object API that facilitates managing communication of the object. In an example, the API 404 can be based on the sockets abstraction, where a socket corresponds to an Object Transport Service Access Point, described in examples above. After creation, a socket can be bound to a local OT Port, using the ot_bind( ) API call. In the case of connectionless sockets, described above, the socket can be used to send objects to arbitrary remote OT Endpoints or to receive objects from arbitrary Connectionless OT SAPs.

A connection-oriented socket, for example, can be connected to a remote OT SAP by issuing a connect( ) API call, specifying a remote OT Endpoint. The OT Endpoint can be specified by providing either an OT Host Identity, an OT Locator or both. Normal and lazy connection modes can be provided, as described above. By default, connection-oriented sockets do not provide in-order delivery of objects. A socket option can be provided, however, to enable in-order delivery. In addition, the listen( ) and accept( ) functions are provided to accept new connections on a connection-oriented socket.

Sockets can be identified on the API 404 by socket descriptors. An analog of the operating system poll( ) function for network node 400 is provided by the ot_poll( ) function, shown below, which can be used for asynchronous programming. ot_poll( ) can be provided with the pollfd array to detect events on operating system descriptors and additionally a new otpollfd array for detecting events on Object Transport socket descriptors at network node 400. Objects can be identified on the API 404 by object descriptors.

In one example implementation, the following table can describe the data types used within the API 404:

| Data type | Underlying type | Description |
| --- | --- | --- |
| OTHandle | Opaque | A handle to a reference-counted OT data structure |
| OTReturn | int | Return value type for various functions |
| OTSocket | int/ OTHandle | A descriptor for an Object Transport Socket |
| OTEndpoint | OTHandle | An identifier for an OT Endpoint. This may be a (Host Identity, OT Port) pair or a (Locator, OT Port) pair or both. |
| OTEndpointIdentity | struct sockaddr | A global identifier for an OT Endpoint e.g., (Host Identity, OT Port pair) |
| OTEndpointLocator | struct sockaddr | A locator for an OT Endpoint e.g., (Locator, OT Port pair) |
| OTPort | uint16 | A local (within one host) identifier for an OT Endpoint |
| OTObject | OTHandle | A descriptor for an Object |
| OTProperties | OTHandle | A data structure specifying properties (or changes to properties) for an Object |
| OTObjectTag | uint64 | A user-provided tag for the object |
| OTSocketType | enum | Socket types |
| OTEvent | int | Event type mask |
| OTPermanantObject | | Permanent identifier for an object |
| OTObjectStatus | enum | Object status codes |

In one example implementation, the following table can describe some constants used within the API 404:

| Socket types | |
| --- | --- |
| OT_SOCK_CONNECTED | Connection-oriented socket type |
| OT_SOCK_CONNECTIONLESS | Connectionless socket type |
| Socket connect modes | |
| OT_CONNECT_NORMAL | Establish connection to remote endpoint immediately |
| OT_CONNECT_LAZY | Delay connection establishment until first object is sent |
| Event type masks | |
| OT_SEND_COMPLETE | Sending of an object has completed |
| OT_RECV_STARTED | Reception of an object has started |
| OT_RECV_COMPLETE | Reception of an object has completed |
| OT_CANCELLED | An object has been cancelled by the remote endpoint |
| OT_FREEZE_COMPLETE | Object freezing has completed |
| OT_THAW_COMPLETE | Object thawing has completed |
| OT_EXPIRED | An object deadline expired before it was received |
| OT_ABORTED | An object was aborted due to an exception condition |
| Property names | |
| OT_PROP_PRIORITY | |
| OT_PROP_DEADLINE | |
| OT_PROP_RESPONSE_PROPS | |
| Return codes | |
| OT_SUCCESS | Operation succeeded |
| OT_NO_MEMORY | Operation failed due to lack of memory |
| OT_INVALID_PARAMETER | A supplied parameter was invalid |
| OT_NO_IDENTITY | The identity of the OT Endpoint is unknown |
| Socket options | |
| OT_SO_TYPE | Socket type (read only) |
| OT_SO_IN_ORDER | Enable/disable in-order delivery |
| OT_IP_ADD_MEMBERSHIP | Add multicast group membership |
| OT_IP_DROP_MEMBERSHIP | Drop multicast group membership |
| Object status codes | |
| OT_SENDING | Object sending is in progress |
| OT_SENT | Object has been successfully sent |
| OT_RECEIVING | Object reception is in progress |
| OT_RECEIVED | Object reception is complete |
| OT_THAWING | Object is being thawed from permanent store |
| OT_CANCELLED | Object was cancelled during sending/receiving |
| OT_EXPIRED | Object deadline expired |
| OT_ABORTED_NO_MEMORY | Object aborted due to memory exception at the receiver |
| OT_ABORTED_BAD_CONNECTION | Object aborted due to connection exception |

Several of the data objects managed by OT are referred to using the OTHandle data type. Access to the data within the underlying object is achieved through function calls; the OTHandle structure itself is opaque to the application. Data objects managed by OT (including OTEndpoint, OTHostIdentity, OTLocator, OTObject, OTProperties) can be reference counted. Reference counts can be increased and decreased using the ot_retain( ) and ot_release( ) functions on the OTHandle object. Functions which return objects of these types return the object with a single reference allocated to the application and therefore the application can call ot_ release( ) on such objects to ensure correct deallocation of the resources. In addition, an OTHandle can be Null, in which case it does not refer to any object. The function ot_is_null( ) can be used to test this condition. The function ot_null_handle( ) returns a null OTHandle, which can be used to initialize OTHandle data types.

```
/** Return a null OTHandle
 *  @return A null OTHandle
 */
OTHandle ot_null_handle( );
/** Test whether an OTHandle is null
 *  @param handle The OTHandle to test
 *  @return 0 if the handle is not null, non-zero otherwise
 */
int ot_is_null( OTHandle handle );
/** Increment object reference count
 *  @param handle Handle to the object to increase reference
         count
 */
void ot_retain( OTHandle handle );
/** Decrement object reference count
 *  @param handle Handle to the object to decrease reference
         count
 */
void ot_release( OTHandle handle );
```

In one example, the data structures API of API 404 can be implemented according to the following aspects. An OTEndpoint object can identify an OT Endpoint either by a (Host Identity, OT Port) pair, or by an (OT Locator, OT Port) pair or both. When OT communication is initiated, an initial OT Locator can be provided. During establishment of the communication the Host Identity of the endpoint at the provided OT Locator can be discovered. Subsequent communication between hosts may or may not use the OT Locator provided during establishment and in general the application is not made aware of changes in the set of OT Locators used for communication. As noted above, OT Locators can be IPv4 or IPv6 addresses and as such the standard struct sockaddr structure can be used to represent a (Locator, OT Port) pair. OT Host Identities can be Host Identity Protocol identities and as such the standard struct sockaddr structure can be also used to represent a (Host Identity, OT Port) pair, where it is the 128 bit Host Identity Tag that is included in the structure. OTEndpoint structures can be initialized using the ot_endpoint( ) function. The endpoint identity and the endpoint locator can be queried.

```
/** Initialise an OTEndpoint structure
 *  @param identity [in] The identity of the remote OT Endpoint
 *  @param locator [in] A locator for the remote OT Endpoint
 *  @param endpoint [out] The OTEndpoint to be initialised
 *  @return OT_SUCCESS or error code
 *
 * NOTE:    Either, but not both, of the identity and locator
 *          parameters may be null.
 *          If both identity and locator are provided then the OT
Port
 *          is taken from the identity structure and the port entry
in
 *          the locator is ignored.
 */
OTReturn ot_endpoint (   const OTEndpointIdentity* identity,
                         const OTEndpointLocator* locator,
                         OTEndpoint* endpoint );
/** Obtain the endpoint identity
 *  @param endpoint [in] The OTEndpoint object
 *  @param identity [out] The returned endpoint identity
 *  @return       OT_SUCCESS on success,
 *                OT_INVALID PARAMETER if the OTEndpoint
                  object is
                  null,
 *                OT_NO IDENTITY if the endpoint identity is
                  unknown.
 */
OTReturn ot_get identity( OTEndpoint endpoint,
OTEndpointIdentity* identity );
```

In addition, OTProperties structures can be managed using the ot_initproperties( ), ot_getproperty( ), ot_setproperty( ), and ot_clearproperty( ) functions.

```
/** Initialise a new OTProperties structure
 *  @param props The OTProperties structure
 */
void ot_initproperties( OTProperties* props );
/** Get a property from an OTProperties structure
 *  @param props The OTProperties structure
 *  @param name The name of the property to get
 *  @param length The length of the data field
 *  @param data The data field where the property will be written
 *  @return OT_SUCCESS or error code
 */
OTReturn ot_getproperty(       const OTProperties* props,
                               OTPropertyName name,
                               OTLength length,
                               void* data );
/** Set a property in an OTProperties structure
 *  @param props The OTProperties structure
 *  @param name The name of the property to get
 *  @param length The length of the data field
 *  @param data The data field where the property will be written
 *  @return OT_SUCCESS or error code
 */
OTReturn ot_setproperty(       OTProperties* props,
                               OTPropertyName name,
                               OTLength length,
                               void* data );
/** Clear a property from an OTProperties structure
 *  @param props The OTProperties structure
 *  @param name The name of the property to get
 *  @return OT_SUCCESS or error code
 */
OTReturn ot_clearproperty(     const OTProperties* props,
                               OTPropertyName name );
```

Moreover, in one example, a socket API of the API 404 can be implemented according to the following aspects. Sockets are created using the ot_socket( ) function:

```
/** Create a new object transport socket
 *  @param type The socket type
 *  @return The new socket descriptor
 */
OTSocket ot_socket( OTSocketType type );
```

Sockets are destroyed using the ot_close( ) function:

```
/** Close an object transport socket
 *  @param sock The socket to close
 *  @return OT_SUCCESS or error code
 */
OTReturn ot_close( OTSocket sock );
```

A socket is bound to a local OT Port using the ot_bind( ) function:

```
/** Bind an object transport socket to a local OT Port
 *  @param sock The socket descriptor
```

-continued

```
 *   @param localport The local OT Port
 *   @return OT_SUCCESS or error codes
 */
    OTReturn ot_bind( OTSocket sock, OTPort localport );
```

Moreover, for example, a socket which has been bound to a local OT Port can be connected to a remote endpoint using the ot_connect( ) function. If the socket is a connectionless socket, this call specifies the peer with which the socket is to be associated. This address is that to which datagrams are to be sent and the only address from which datagrams are to be received. If the socket is connection-oriented, this call indicates that a connection to another socket should be established. In this case there are two connection modes, OT_CONNECT_NORMAL and OT_CONNECT_LAZY, as described above.

```
/** Establish an Object Transport connection
 *   @param sock The socket to connect
 *   @param remote The remote OT endpoint to connect to
 *   @param mode The connection mode (ignored for connectionless sockets)
 *   @return OT_SUCCESS or error codes
 */
OTReturn ot_connect(       OTSocket sock,
                           OTEndpoint remote,
                           OTConnectionMode mode );
```

A connection-oriented socket which has been bound to a local OT Port can be used to listen for incoming OT connections using the ot_listen( ) function. This function returns immediately and subsequently the ot_accept( ) function is used to accept incoming connections.

```
/** Set a socket as listing for incoming connection
 *   @param sock The socket to mark as listening
 *   @return OT_SUCCESS or error codes
 */
    OTReturn ot_listen( OTSocket sock );
```

A socket which has been marked as a listener maintains a queue of incoming connection requests. The ot_accept( ) function is used to obtain a new connection-oriented socket for the first request on the queue, or to wait for a new request if the queue is empty.

```
/** Accept a new connection on a socket
 *   @param sock The listener socket on which to accept a connection
 *   @param endpoint On return, contains the endpoint from which the
 *          accepted connection request was received
 *   @return A new connection oriented socket
 */
    OTSocket ot_accept( OTSocket sock, OTEndpoint* endpoint );
```

An OT socket maintains a queue of pending events, which can be queried with the ot_pop event( ) function. The presence of a new event can be detected using the ot_poll( ) function. The ot_pop_event( ) function pops the oldest event of a type that is selected by the event mask supplied from the queue, or waits for the next event to occur if the queue does not contain any events matching the mask.

```
/** Obtain the next event on a socket
 *   @param sock The socket
 *   @param events [in/out] Event mask specifying
 requested/returned event
 *   @param odesc [out] The object descriptor for the object on
 which
             the event occurred.
 *   @return OT_SUCCESS or error code
 */
OTReturn ot_pop event(     OTSocket sock,
                           OTEvent* events,
                           OTObject* odesc );
```

Socket options can be read and written using the ot_setsockopt( ) and ot_getsockopt( ) calls. The supported socket options can be, for example:

| Socket option | Data type | Description |
| --- | --- | --- |
| OT_SO_TYPE | Int | Socket type (read only) |
| OT_SO_IN_ORDER | Int | Enables/disables in-order object delivery for the socket |
| OT_IP_ADD_MEMBERSHIP | struct ip_mreq | Add multicast group membership |
| OT_IP_DROP_MEMBERSHIP | struct ip_mreq | Drop multicast group membership |

```
/** Set a socket option
 *   @param socket The OT socket
 *   @param level The option level (is this needed ?)
 *   @param option_name Socket option name
 *   @param option_value [in] The option value
 *   @param option_len [in] The option value length
 *   @return OT_SUCCESS or error code
 */
OTReturn ot_setsockopt(    OTSocket socket,
                           int level,
                           OTSocketOption option_name,
                           void *option_value,
                           OTLength option_length );
/** Get a socket option
 *   @param socket The OT socket
 *   @param level The option level (is this needed ?)
 *   @param option_name Socket option name
 *   @param option_value [out] The option value
 *   @param option_len [in/out] The option value length
 *   @return OT_SUCCESS or error code
 */
OTReturn ot_getsockopt(    OTSocket socket,
                           int level,
                           OTSocketOption option_name,
                           void *option_value,
                           OTLength* option_length );
```

Socket events can be detected using the ot_poll( ) function. This function allows events to be detected across multiple OT sockets as well as Operating System sockets/file descriptors (as with the POSIX poll( ) function). The ot_poll( ) function uses the pollfd and otpollfd data structures, defined as follows:

```
struct pollfd {
     int          fd;            /* file/socket descriptor */
     short        events;        /* events to look for */
     short        revents;       /* events returned */
};
struct otpollfd {
     OTObject     odesc;         /* object descriptor */
     OTEvent      events;        /* events to look for */
```

-continued

```
    OTEvent    revents;        /* events returned */
};
/** Poll for socket events
 *  @param fds Array of pollfd structures for operating system
           descriptors/events
 *  @param nfds Number of pollfd structures for OS events
 *  @param otfds Array of otpollfd structures for OT sockets
 *  @param notfds Number of otpollfd structures for OT events
 *  @param timeout Timeout in ms, zero to return immediately, −1 to
           wait indefinitely
 *  @return OT_SUCCESS or error code
 */
OTReturn ot_poll(          struct pollfd fds [ ], nfds_t nfds,
                           struct otpollfd otfds [ ], nfds_t
                               notfds,
                           int timeout );
```

The standard operating system event masks are used in the fds array but for the otfds array the event masks are OT ones as follows: OT_SEND_COMPLETE, OT_RECV_STARTED, OT_RECV_COMPLETE, OT_CANCELLED, OT_EXPIRED, OT_ABORTED.

In one example, the object API of API 404 can be implemented according to the following aspects. The ot_send( ) and ot_sendto( ) functions are used to initiate sending of an object on a connectionless or connection-oriented socket respectively. These functions do not block; if notification is required of the completion of the sending of the object, then either use ot_poll( ) and/or ot_pop_event( ) to detect the object complete event on the socket.

```
/** Send an object on a connectionless socket
 *  @param sock The socket on which to send the object
 *  @param dest The destination endpoint
 *  @param data Pointer to the object data
 *  @param len Length of the object data in bytes
 *  @param tag The object tag
 *  @param props [in] The object properties
 *  @param odesc [out] The object descriptor of the new object
 *  @return OT_SUCCESS or error code
 */
OTReturn ot_sendto(        OTSocket sock,
                           OTEndpoint dest,
                           void* data,
                           OTLength len,
                           OTObjectTag tag,
                           const OTProperties* props,
                           OTObject* odesc );
/** Send an object on a connection-oriented socket
 *  @param sock The socket on which to send the object
 *  @param data Pointer to the object data
 *  @param len Length of the object data in bytes
 *  @param tag The object tag
 *  @param props [in] The object properties
 *  @param odesc [out] The object descriptor of the new object
 *  @return OT_SUCCESS or error code
 */
OTReturn ot_send(          OTSocket sock,
                           void* data,
                           OTLength len,
                           OTObjectTag tag,
                           const OTProperties* props,
                           OTObject* odesc );
```

The ot_recv( ) and ot_recvfrom( ) functions can be used to receive an object on a connection-oriented or connectionless socket respectively. Each socket maintains a queue of received objects and if an explicit object descriptor is not specified, these functions return the first completely received object in the socket receive queue, or block until an object is available if the queue is empty. If an explicit object descriptor is specified, these functions block until that object is available, cancelled or expired. For asynchronous operation use the select( ) and ot_pop_event( ) functions to detect reception of an object.

```
/** Receive an object from a connectionless socket
 *  @param sock The socket on which to receive the object
 *  @param odesc [in/out] The descriptor of the received object
 *  @param remote [out] The remote OT endpoint
 *  @param len [out] The length in bytes of the received object
 *  @param tag [out] The tag of the received object
 *  @param props [out] The received object properties
 *  @param data [out] The object data
 *  @param bufferlen [in/out] The data buffer length
 *  @return OT_SUCCESS or error code
 */
OTReturn ot_recvfrom(      OTSocket sock,
                           OTObject* odesc,
                           OTEndpoint* remote,
                           OTLength* len,
                           OTObjectTag* tag,
                           OTProperties* props,
                           Void* data,
                           OTLength* bufferlen );
/** Receive an object from a connection-oriented socket
 *  @param sock The socket on which to receive the object
 *  @param odesc [out] The descriptor of the received object
 *  @param len [out] The length in bytes of the received object
 *  @param tag [out] The tag of the received object
 *  @param data [out] The object data
 *  @param bufferlen [in/out] Buffer length
 *  @return OT_SUCCESS or error code
 */
OTReturn ot_recv(          OTSocket sock,
                                OTObject* odesc,
                           OTLength* len,
                           OTObjectTag* tag,
                           OTProperties* props,
                           Void* data,
                           OTLength* bufferlen );
```

The caller of these functions can pass Null for the len, tag, props and data pointers if that information is not required. On entry, the field pointed to by bufferlen should contain the buffer size at the buffer pointed to by data. On exit this field is overwritten by the number of bytes returned. If the buffer is smaller than the object size, repeated calls to ot_recvfrom or ot_recv for the same object will return successive portions of the object.

In addition, the ot_obj_pop_event( ) function can be used to obtain the next event related to a specified object. Note that if two threads wait simultaneously on a socket (with ot_pop_event( ) or ot_poll( )) and on an object then only the thread waiting on the object will be notified when an event occurs.

```
/** Obtain the next event on an object
 *  @param odesc The object descriptor
 *  @param events Mask of requested/returned events
 *  @return OT_SUCCESS or error code
 */
OTReturn ot_obj_pop_event( OTObject odesc, OTEvent* events );
```

The ot_getbytes( ) function retrieves bytes from a received object.

```
/** Get bytes from a received object
 *  @param odesc The object descriptor
 *  @param first The index of the first byte to get
 *  @param len [in/out] The maximum bytes to get/actual bytes
       got
```

```
 * @param data Pointer to buffer in which to place the data
 * @return OT_SUCCESS or error codes
 */
OTReturn ot_getbytes(      OTObject odesc,
                           OTLength first,
                           OTLength* len,
                           void* data );
```

The ot_getinfo( ) can be used to obtain information about an object, including the object tag, length and properties.

```
/** Get information about an object
 * @param odesc The object descriptor
 * @param remote [out] The endpoint that sent the object
 * @param tag [out] The object tag
 * @param len [out] The object length
 * @param props [out] The object properties
 * @return OT_SUCCESS or error codes
 *
 * Note: the pointer parameters tag, len, props may be set to
zero
 * in which case that piece of information will not be returned
 */
OTReturn ot_getinfo(       OTObject odesc,
                           OTEndpoint* remote,
                           OTObjectTag* tag,
                           OTLength* len,
                           OTProperties* props );
```

Properties for an object may be changed whilst it is being sent or received using the ot_setproperties( ) function.

```
/** Set the properties of an object
 * @param odesc The object descriptor
 * @param props The new object properties
 * @return OT_SUCCESS or error code
 */
OTReturn ot_setproperties( OTObject odesc,
                           Const OTProperties* props );
```

The in-progress sending or reception of an object can be cancelled with the ot_cancel( ) method. Note that is still possible that a cancelled object will be received at the receiver if the ot_cancel( ) is issued at the sender after sufficient data to transport the object has been sent but before the receiver has confirmed reception or if ot_cancel( ) is issued at the receiver after reception of the object has completed.

```
/** Cancel sending or reception of an object
 * @param odesc The object descriptor
 * @return OT_SUCCESS or error codes
 */
OTReturn ot_cancel( OTObject odesc );
```

In some communication models, it can occur that two objects being received on the same or different sockets are identified as containing the exact same data. In this case, receipt of the objects can be accelerated by merging the two objects into one using the ot_merge( ) function. Following this function the two object descriptors become synonymous.

```
/** Merge reception of two identical objects
 * @param odesc1 First object descriptor
 * @param odeac2 Second object descriptor
 * @return OT_SUCCESS on success or error codes
 */
OTReturn ot_merge( OTObject odesc1, OTObject odesc2 );
```

Objects identified by object descriptors have a lifetime associated with the process within which they are created until they are explicitly stored using the ot_freeze( ) function. The ot_thaw( ) function can be used to retrieve a previously frozen object, and the ot_discard( ) function can be used to discard a frozen object.

```
/** Store an object into a persistent store
 * @param odesc Object descriptor
 * @param pid [out] Permanent object identifier
 * @param async [in] If true then this function will not block
and
 *                                freezing takes place in background
 * @return OT_SUCCESS or error codes
 */
OTReturn ot_freeze(        OTObject odesc,
                           OTPermanantObject* pid,
                           int async );
/** Retrieve an object from persistent store
 * @param pid Permanent object identifier
 * @param odesc [out] Object descriptor
 * @param async [in] If true then this function will not block
and
 *                                freezing takes place in background
 * @return OT_SUCCESS or error codes
 */
OTReturn ot_thaw(    const OTPermanantObject* pid,
                           OTObject* odesc,
                           int async );
/** Discard a frozen object
 * @param pid Permanent object identifier
 *    @return OT_SUCCESS or error codes
 */
OTReturn ot_discard( const OTPermanantObject* pid );
```

Thus, API 404 allows application 402 to frame objects for communicating over object-based transport protocol 406. For example, application 402 can determine the size of the objects and is not restricted to fixed-length packets, as with TCP. Moreover, application 402 can specify object properties, such as priority, transmission deadline, response properties, object tag, etc., as described. In addition, application 402 can control transmission of objects from a remote network node to network node 400, as described previously.

Figure 5:
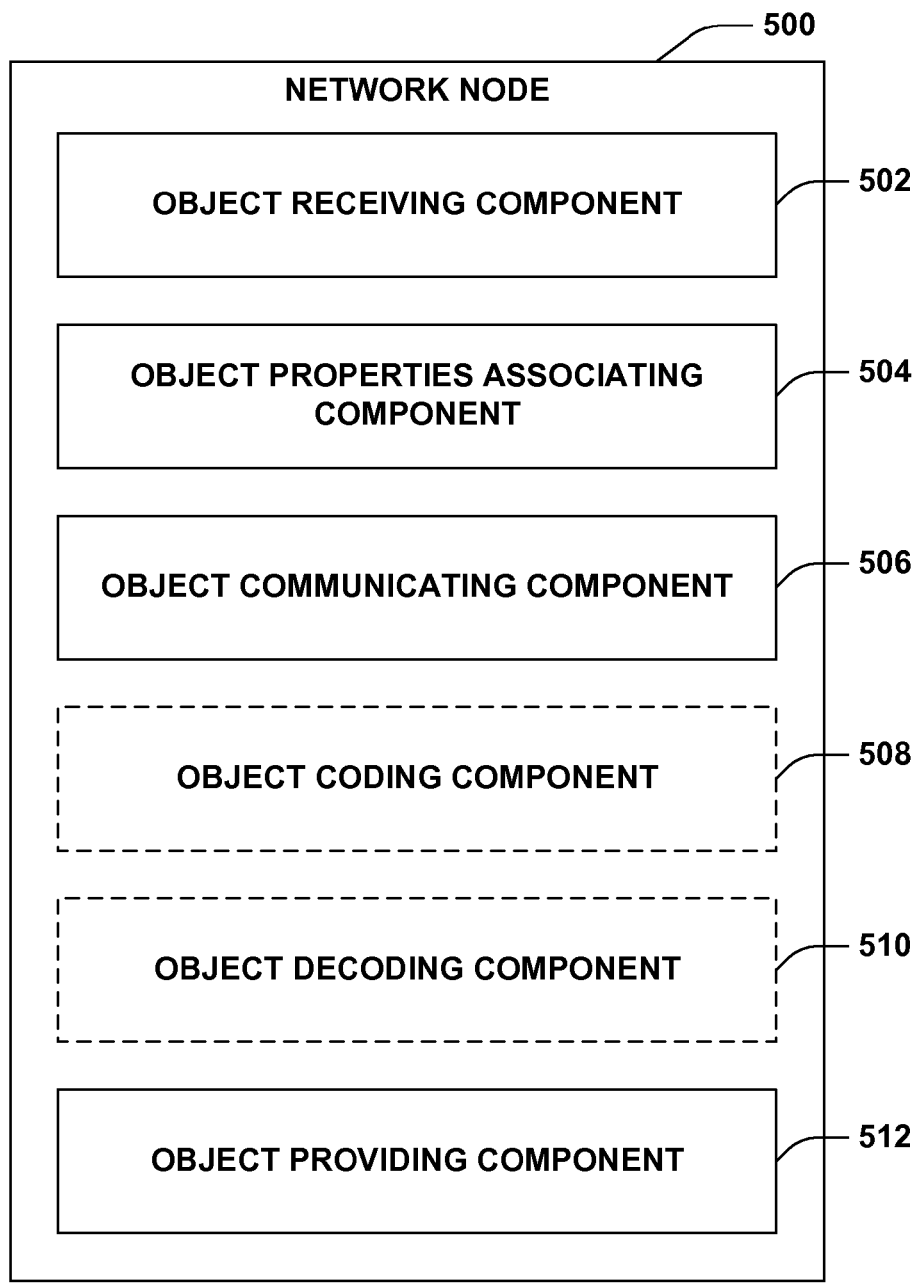
FIG. 5 illustrates an example network node that communicates using one or more functions of an object-based transport protocol.

Referring to FIG. 5, a network node 500 is illustrated that facilitates transmitting objects to one or more remote network nodes using an object-based transport protocol. Network node 500, as described, can be a device, UE, computer, server, substantially any node or network node described herein, and/or similar component, or portion thereof that communicates with one or more remote network nodes. Network node 500 can comprise an object receiving component 502 for obtaining an object from an application or other protocol layer above an object-based transport protocol layer, an object properties associating component 504 that receives and/or correlates metadata with the object, and an object communicating component 506 that transmits the object over one or more network interfaces to a remote network node (not shown). Network node 500 can also comprise an optional object coding component 508 that encodes at least a portion of the object or properties associated therewith, an optional object decoding component 510 that decodes one or more received objects, and an object providing component 512 that sends decoded objects to an application layer. In one example, object receiving component 502, object properties associating component 504, object communicating component 506, object coding component 508, object decoding component 510, and object providing component 512 can be implemented as part of an object-based transport protocol to provide functionality thereof, as described herein.

According to an example, object receiving component 502 can receive objects from one or more applications at network node 500. In addition, object properties associating component 504 can receive properties, tags, etc. from the applications for correlating to the objects. In this regard, as described, the applications can frame the objects and determine priority, transmission deadline, similar response properties, and/or other metadata for associating with the objects, as described. For example, network node 500 can implement an API that facilitates sending objects and related metadata to object receiving component 502 and object properties associating component 504, which can be utilized by the applications.

For example, object communicating component 506 can maintain one or more connection-oriented sessions with one or more remote network nodes, as described, that facilitate communicating with the network nodes over one or more channels. In another example, object communicating component 506 can include one or more connectionless sessions that can be initialized and utilized for transmitting objects as received from an application. In either case, for example, object communicating component 506 can select a session for the object (e.g., and/or related metadata) for transmitting to a remote network node. Object communicating component 506 can transmit the object to the remote network node.

For example, transmitting the object at object communicating component 506 can be based at least in part on determining a sending opportunity over one or more channels related to the session, as described previously, which can be based at least in part on detecting a sending opportunity for at least one network interface related to the one or more channels, as described. Object communicating component 506 can also determine the sending opportunity for the one or more channels based at least in part on determining that the priority indicated for the one or more objects is higher than different priorities of different objects in different sessions that have a channel to the at least one network interface (e.g., and/or that a transmission deadline specified in object metadata has not passed). Moreover, as described, object communicating component 506 can begin analyzing congestion control for the one or more channels to determine whether the one or more channels are available for transmitting in determining the sending opportunity, as described above. For example, this can include determining whether the one or more channels are available for sending the one or more objects, or whether congestion control over the one or more channels prevents such.

In addition, for example, the session, whether connection-oriented or connectionless, can allow access to the remote network node. Moreover, object coding component 508 can encode the object, related metadata, properties related to one or more channels in the session, and/or the like. Thus, as described, object coding component 508 can encode the object to an object coding PDU (e.g., using an erasure code, and/or the like), object metadata into an object control PDU, and/or channel properties (e.g., connection state) into a connection control PDU. In this example, object communicating component 506 can transmit the PDUs to the remote network node.

For example, in any case, object communicating component 506 can frame the PDUs into one or more packets for communicating over one or more network layer protocols. In one example, object communicating component 506, as described, can maintain a session with the remote network node and can manage channels for the session such that object communicating component 506 can add, delete, or modify channels to one or more hosts. Thus, for example, where network node 500 is a wireless network node, object communicating component 506 can allow for mobility thereof by modifying host channels for a session as network node 500 travels over a wireless network. Thus, object communicating component 506 can maintain transparency of host switching through the session with the remote network node, as described. In addition, for example, object communicating component 506 can establish multiple channels with a remote network node over one or more hosts, as described. In this example, object communicating component 506 can add channels to the remote network node by including a security association received from the remote network node (e.g., over an initial channel therewith) in a request to establish an additional channel with the remote network node, as described.

In addition, object communicating component 506 can receive one or more packets from the remote network node in response to objects transmitted thereto. For example, the packets can include response objects (e.g., according to the response properties transmitted with the objects to the remote network node), related encoded PDUs, and/or the like. Where PDUs are received, for example, object decoding component 510 can decode the object and/or related metadata according to the PDUs. In either case, object providing component 512 can communicate the objects to an application layer, as described, based at least in part on a channel over which the object or related PDUs is/are received. In addition, for example, the received object can have metadata as well, which can include an identifier of the object, a tag, etc., for early identification of the object (e.g., for potential merging, as described), response properties, which object communicating component 506 can utilize in communicating any objects in response to the received object, and/or the like. Moreover, for example, object communicating component 506 can transmit and/or receive feedback regarding communications with the remote network node (e.g., within one or more object coding PDUs, and/or the like), as described.

Figure 6:
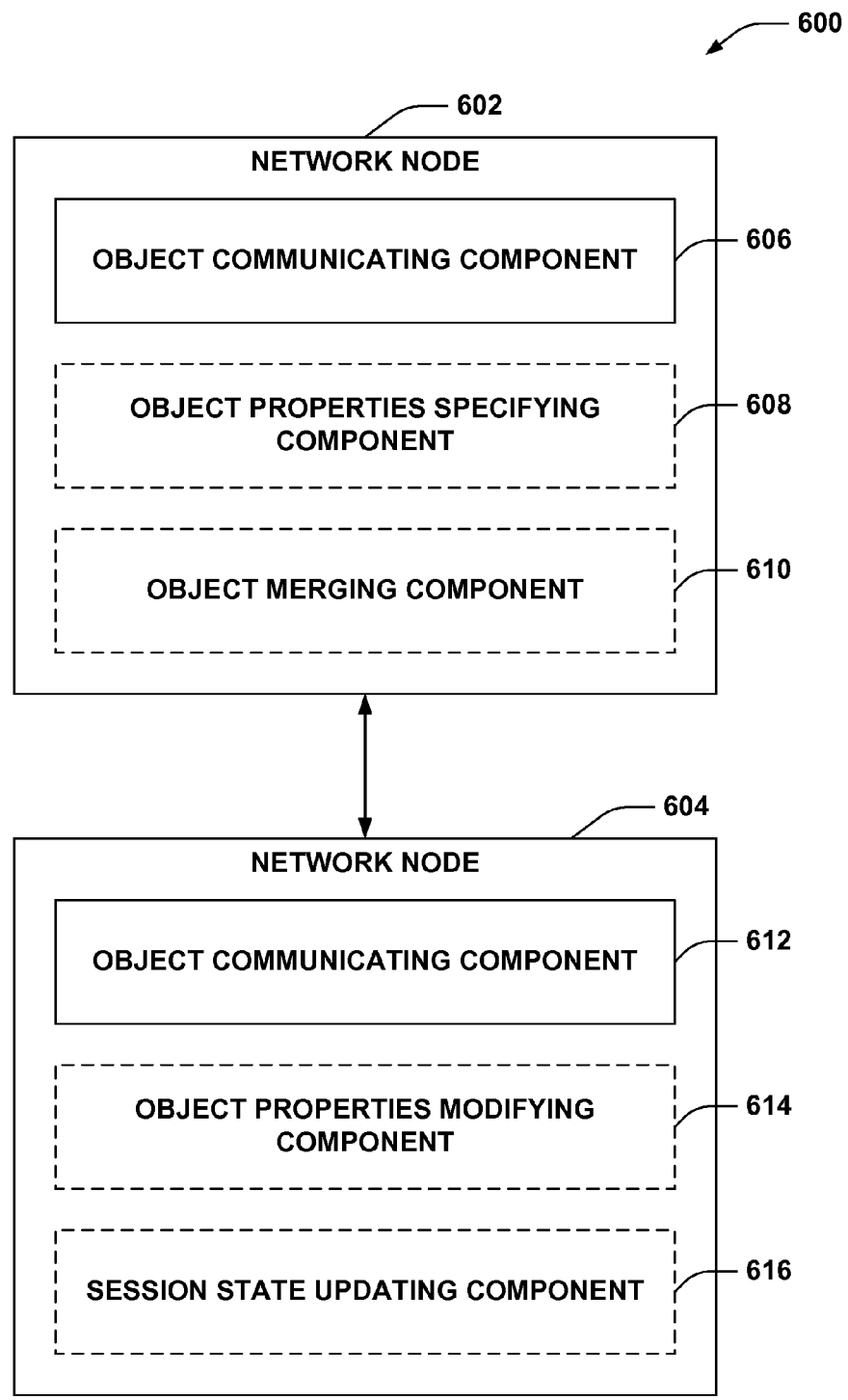
FIG. 6 illustrates an example system for communicating over an object-based transport protocol.

Turning now to FIG. 6, an example communication system 600 is illustrated that facilitates communicating objects in among network nodes. System 600 comprises network nodes 602 and 604 that can communicate objects according to aspects described herein. Network nodes 602 and 604 can each be a device, UE, computer, server, a node or network node described herein, or substantially any node that communicates in a wired or wireless network. It is to be appreciated that network node 602 can additionally comprise similar components as network node 604, and vice versa, to facilitate providing similar functionality. Moreover, network nodes 602 and 604 can include object-based transport protocols within which the described components are implemented.

For example, network node 602 can comprise an object communicating component 606 that transmits and/or receives objects to/from a remote network node over a session, an optional object properties specifying component 608 that can indicate modification of properties associated with objects received from the remote network node, and an optional object merging component 610 that can receive and combine packets received from multiple network nodes to form one or more objects. Network node 604 can include an object communicating component 612 that transmits and/or receives objects to/from a remote network node in a session, an optional object properties modifying component 614 that updates properties of one or more objects being transmitted to the remote network node, and an optional session state updating component 616 that controls a state of one or more sessions for transmitting objects to the remote network node.

According to an example, object communicating component 612 can transmit objects to network node 602, which can be received at object communicating component 606. In an example, object communicating component 606 can request content from network node 604 by transmitting an object thereto. In addition, object properties specifying component 608 can associate response properties (e.g., properties for responding objects) in the request. Object communicating component 612 can receive the request, and object properties modifying component 614 can set properties for objects related to responding to the request for content according to the response properties associated with the request for content. In one example, object properties modifying component 614 can transmit alternative object properties to object properties specifying component 608 and vice versa to facilitate negotiating properties for responding objects, as described. Object communicating component 612 can transmit responding objects to network node 602 according to a set of properties for the responding objects.

Moreover, object properties specifying component 608 can transmit an object to network node 604 requesting modification of object properties while receiving objects from network node 604, as described. In this example, object communicating component 612 can receive the object request modification of object properties, and object properties modifying component 614 can accordingly modify the properties, transmit alternative properties to negotiate, and/or the like, as described. In this regard, in one example, network node 602 can modify priority of the objects being transmitted thereto by network node 604. Thus, for example, where an application requesting such objects closes or otherwise no longer needs to receive objects at a previously indicated priority, network node 602 can cause a change in priority to reduce the rate at which objects are received at network node 602. For example, this can allow for increasing a receiving rate for other objects from network node 604 or one or more other network nodes, decrease power consumption required to receive and process objects, and/or the like.

Furthermore, as described, object properties specifying component 608 can request modification of a state of a channel or session. In one example, object properties specifying component 608 can request that network node 604 discontinue a session (e.g., including placing a session on hold) for a period of time. In this example, object properties specifying component 608 can indicate properties related to the session or a channel within the session (e.g., in an object communicated by object communicating component 608). Once the properties are received, session state updating component 616 can appropriately modify a state of the session, communicate alternative properties to network node 602 to negotiate the state, and/or the like. For example, where session state updating component 616 places a session on hold, the session can be ignored when considering sessions for a sending opportunity, as described previously, to cease transmitting objects from the session.

In yet another example, object communicating component 606 can receive requested objects from network node 604 and another remote network node (e.g., in a distributed implementation). In this regard, object merging component 610 detects whether objects received at object communicating component 606 are for the same data (e.g., based at least in part on properties or tags specified in the objects, as described). Where objects for the same data, object merging component 610 can combine PDUs received for the objects from the multiple network nodes. As described, the PDUs can be encoded using an erasure code; thus, object merging component 610 can receive a number of erasure coded symbols in the PDUs from each network node, and once a number of erasure coded symbols corresponding to the total number of symbols of the object are received, network node 602 can decode the object. Moreover, for example, object communicating component 612 can multicast objects to network node 602 and a plurality of other network nodes.

Referring to FIGS. 7-12, example methodologies relating to providing an object-based transport protocol are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 7:
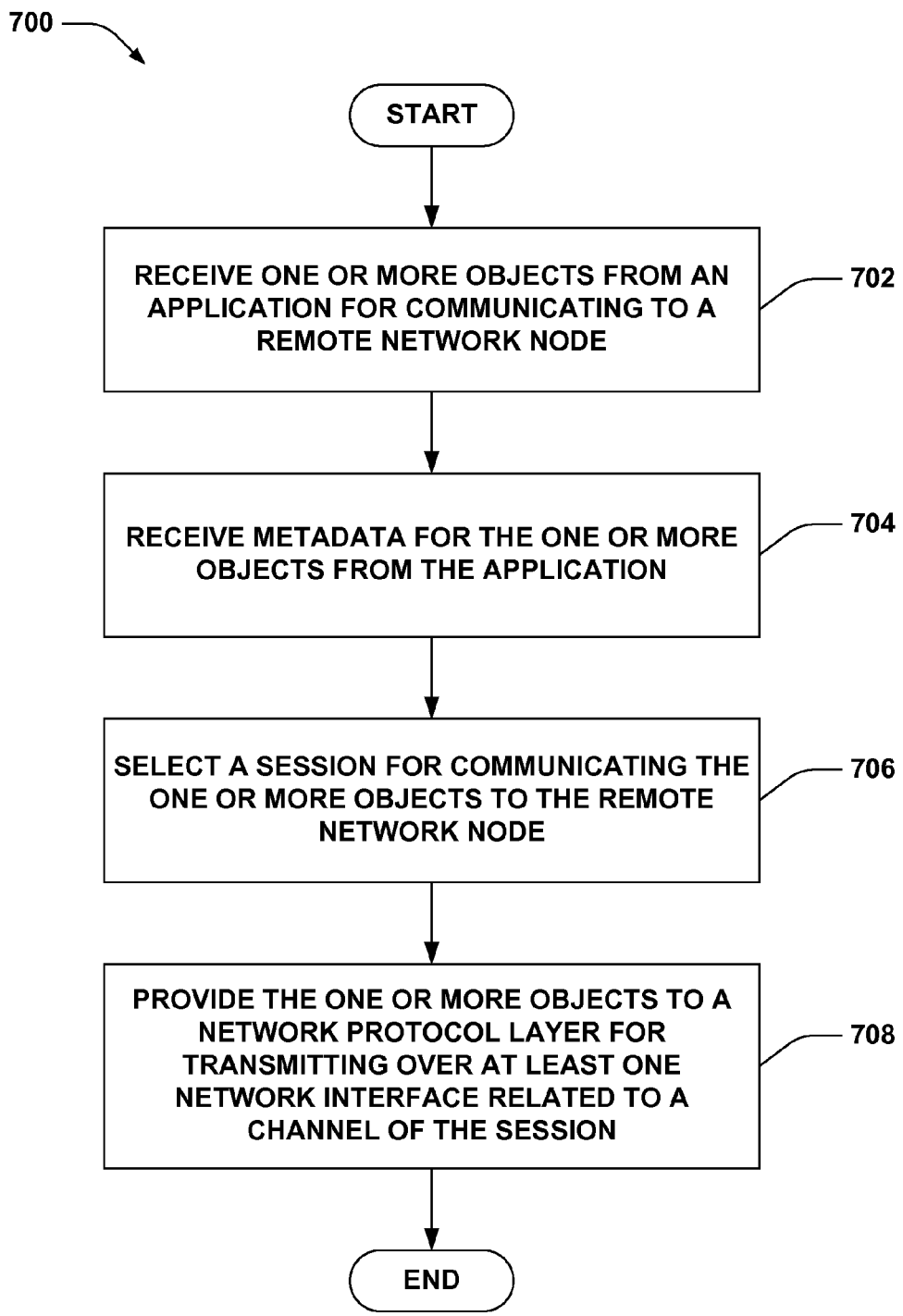
FIG. 7 illustrates an example methodology that facilitates communicating objects over an object-based transport protocol.

Referring to FIG. 7, an example methodology 700 is displayed that facilitates communicating objects using an object-based transport protocol. At 702, one or more objects can be received from an application for communicating to a remote network node. As described, the objects can be framed by the application and can be of arbitrary size. At 704, metadata for the one or more objects can be received from the application. For example, the metadata can relate to a priority, transmission deadline, identifier, or other aspect of the one or more objects. At 706, a session can be selected for communicating the one or more objects to the remote network node. For example, the session can be selected based at least in part on an association with the remote network node, and the session can have one or more channels to the remote network node, as described. At 708, one or more objects can be provided to a network protocol layer for transmitting over at least one network interface related to a channel of the session. As described, the one or more objects can be transmitted over the at least one network interface in a determined sending opportunity.

Figure 8:
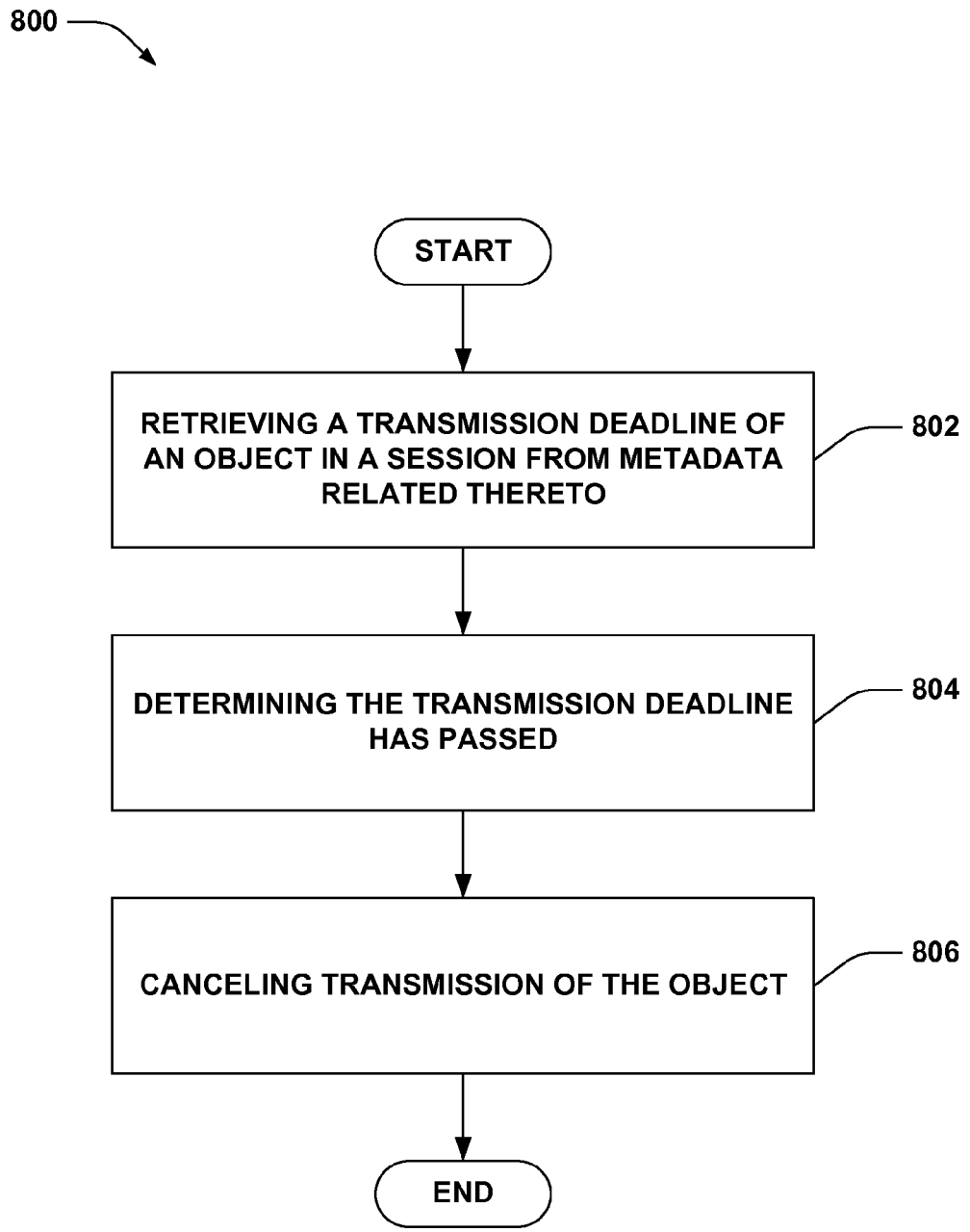
FIG. 8 illustrates an example methodology that cancels transmission of an object according to a transmission deadline.

Turning to FIG. 8, an example methodology 800 is displayed that facilitates utilizing a transmission deadline specified for an object. At 802, a transmission deadline of an object in a session can be retrieved from metadata related thereto. As described, for example, the transmission deadline can be specified by an application and associated with the object in the metadata. At 804, it can be determined that the transmission deadline has passed (e.g., based on comparing the transmission deadline to a current time). Thus, at 806, transmission of the object can be cancelled. This can include, for example, removing the object from the session, modifying a status related to the object, and/or the like.

Figure 9:
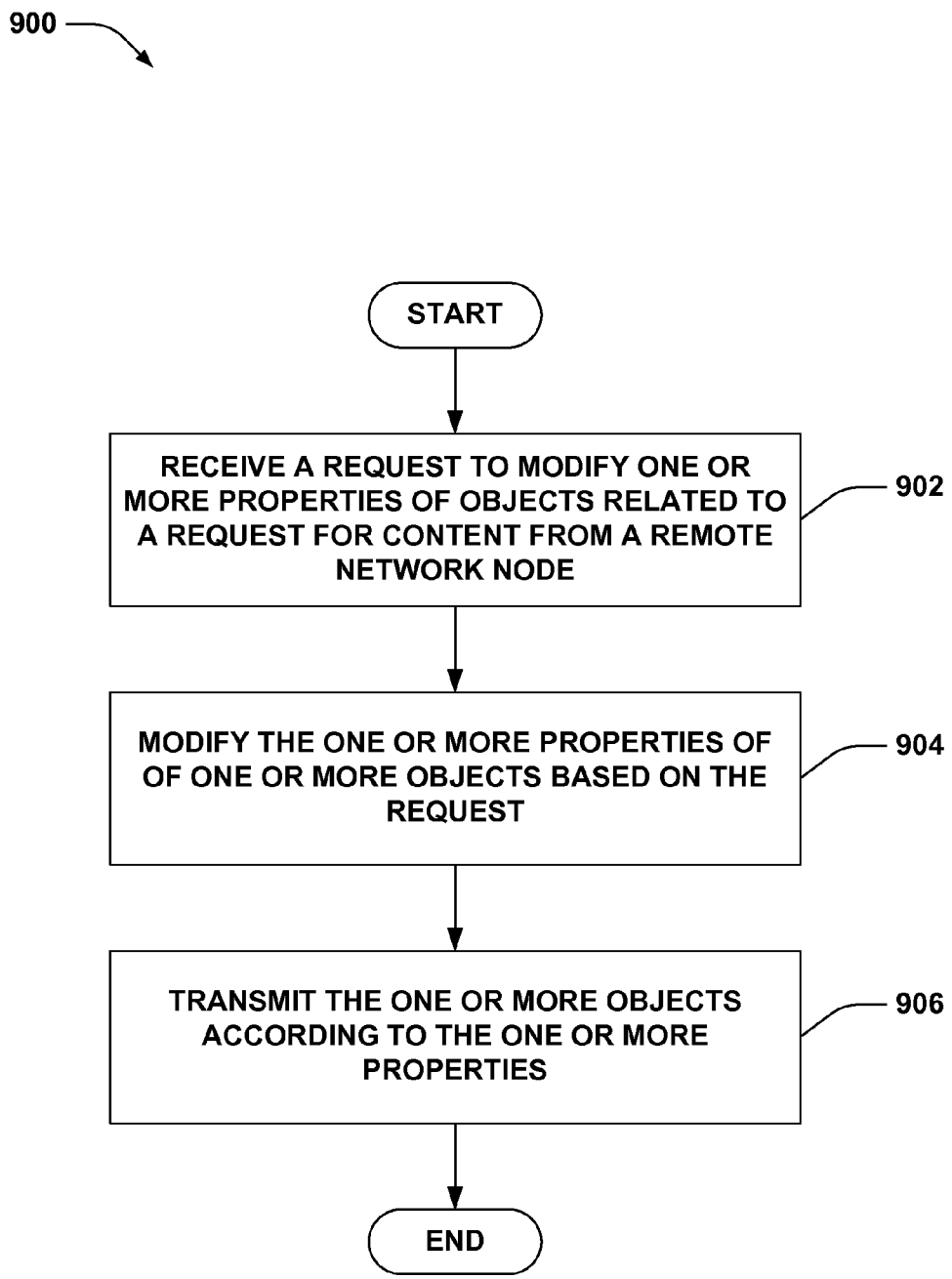
FIG. 9 illustrates an example methodology for modifying one or more properties of objects to be received.

Referring to FIG. 9, illustrated is an example methodology 900 for modifying object properties based on a request from a remote network node. At 902, a request to modify one or more properties of objects related to a request for content can be received from a remote network node. As described, for example, this request can be received as one or more objects. The one or more properties can relate to a priority, transmission deadline, etc. of one or more objects related to the request for content. In one example, transmission of a portion of the objects can have already begun. At 904, the one or more properties of one or more objects can be modified based at least in part on the request. This can include changing properties of objects in a session (e.g., lowering a priority where an application is inactive), for example. At 906, the one or more objects can be transmitted according to the one or more properties. In another example, the request to modify properties can relate to a session or channel thereof, and at 904, a session or channel state can be modified, as described, and at 906, one or more objects can be transmitted (or not transmitted) according to the state modification.

Figure 10:
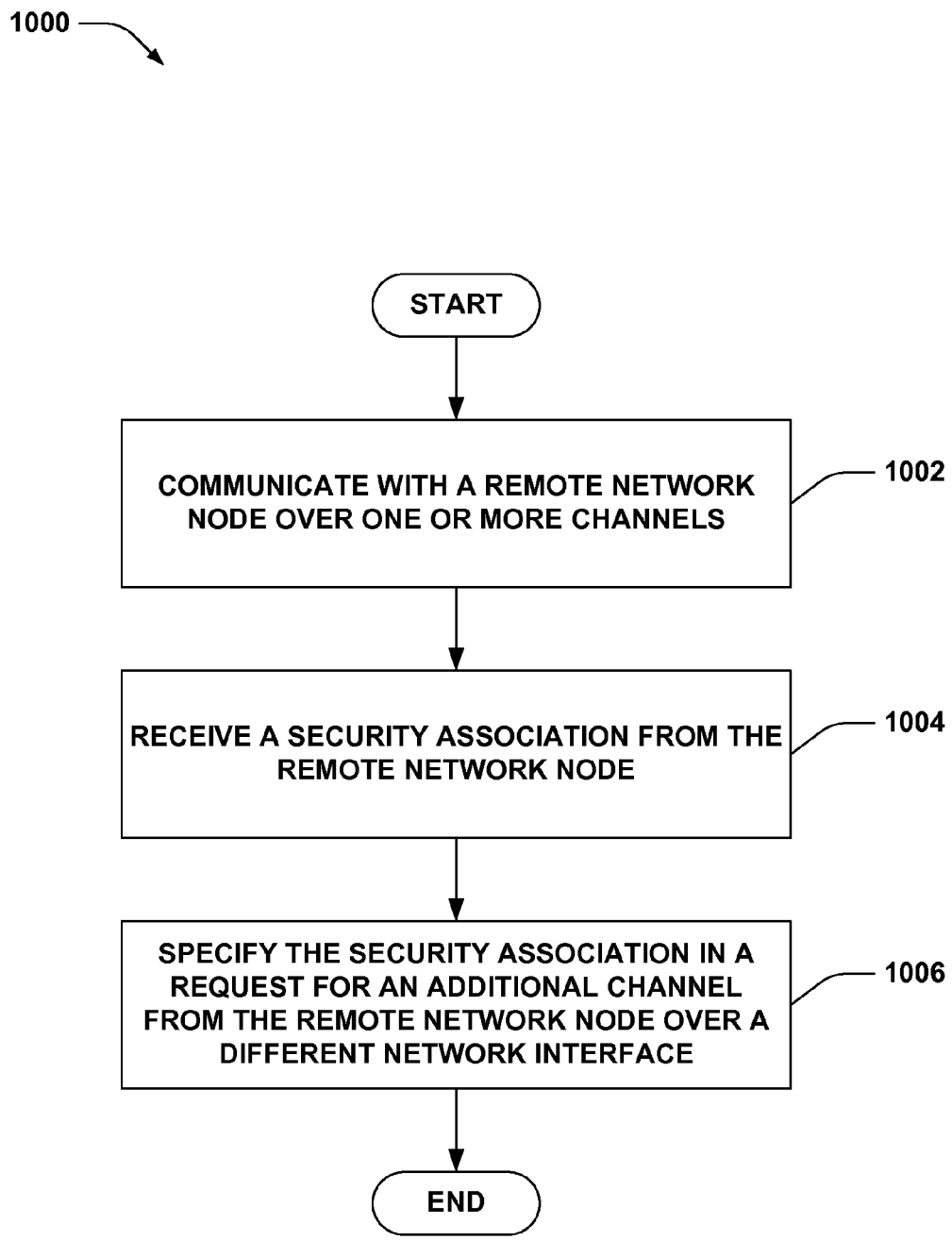
FIG. 10 illustrates an example methodology that maintains multiple channels in a session.

Turning to FIG. 10, an example methodology 1000 is shown that facilitates establishing multiple channels with a remote network node for communicating over an object-based transport protocol. At 1002, a remote network node can be communicated with over one or more channels. As described, the one or more channels can be part of a session to maximize throughput in the session. At 1004, a security association can be received from the remote network node over an initial channel. At 1006, the security association can be specified in a request for an additional channel from the remote network node over a different network interface. This allows the remote network node to verify the initial connection before allowing another connection, for example.

Figure 11:
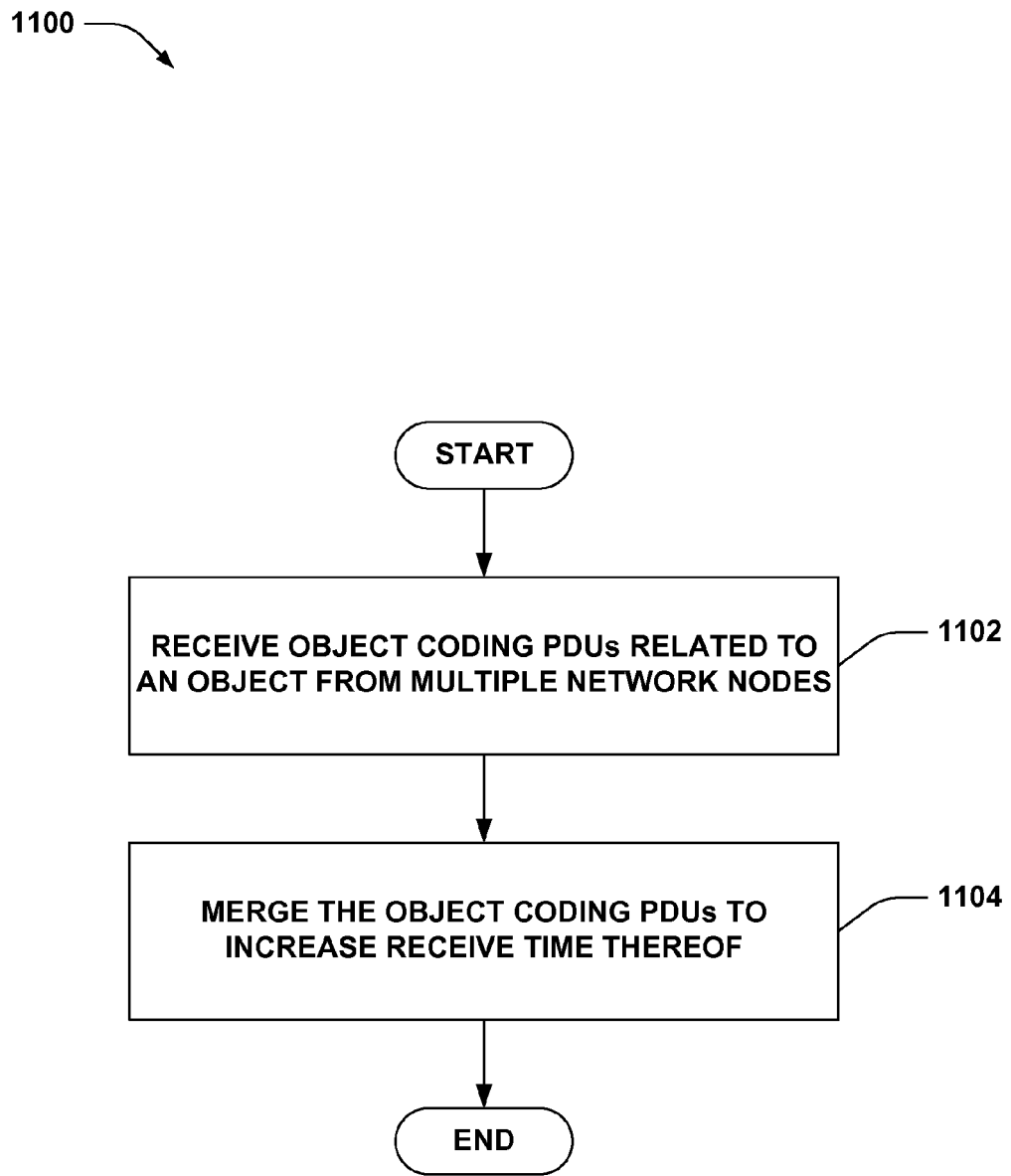
FIG. 11 illustrates an example methodology that merges an object as received from multiple sources.

Referring to FIG. 11, an example methodology 1100 is depicted for merging objects where received from multiple sources. At 1102, object coding PDUs related to an object can be received from multiple network nodes. For example, the object coding PDUs can be distinct erasure code symbols of an identical object (e.g., which can be identified based at least in part on a related identifier or tag, as described). At 1104, the object coding PDUs can be merged to increase a receive time thereof.

Figure 12:
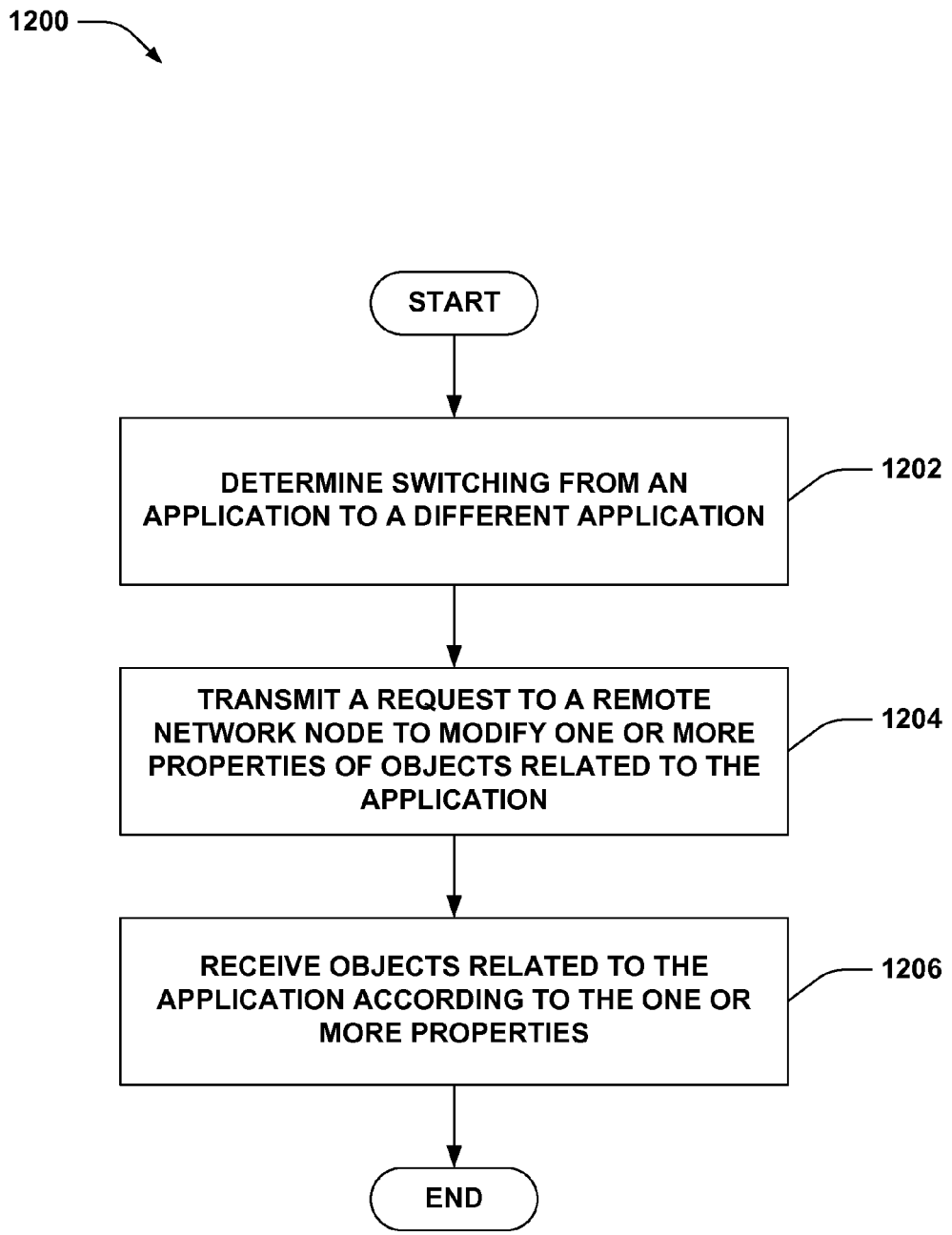
FIG. 12 illustrates an example methodology for requesting modification of properties related to one or more objects to be received.

Turning to FIG. 12, an example methodology 1200 is illustrated for modifying one or more properties of receiving objects from a remote network node. At 1202, switching from an application to a different application can be determined. For example, the application can be receiving streaming data from a remote network node, and the different application can request data from a different network node. Thus, at 1204, a request can be transmitted to a remote network node to modify one or more properties of objects related to the application. The one or more properties, for example, can include a priority of the objects (e.g., lower the transmit priority in view of switching to the different application so as not to receive as many objects related to the application), etc. At 1206, objects related to the application can be received according to the one or more properties, as described.

It will be appreciated that, in accordance with one or more aspects described herein, inferences can be made regarding determining a session to receive a sending opportunity over a network interface, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
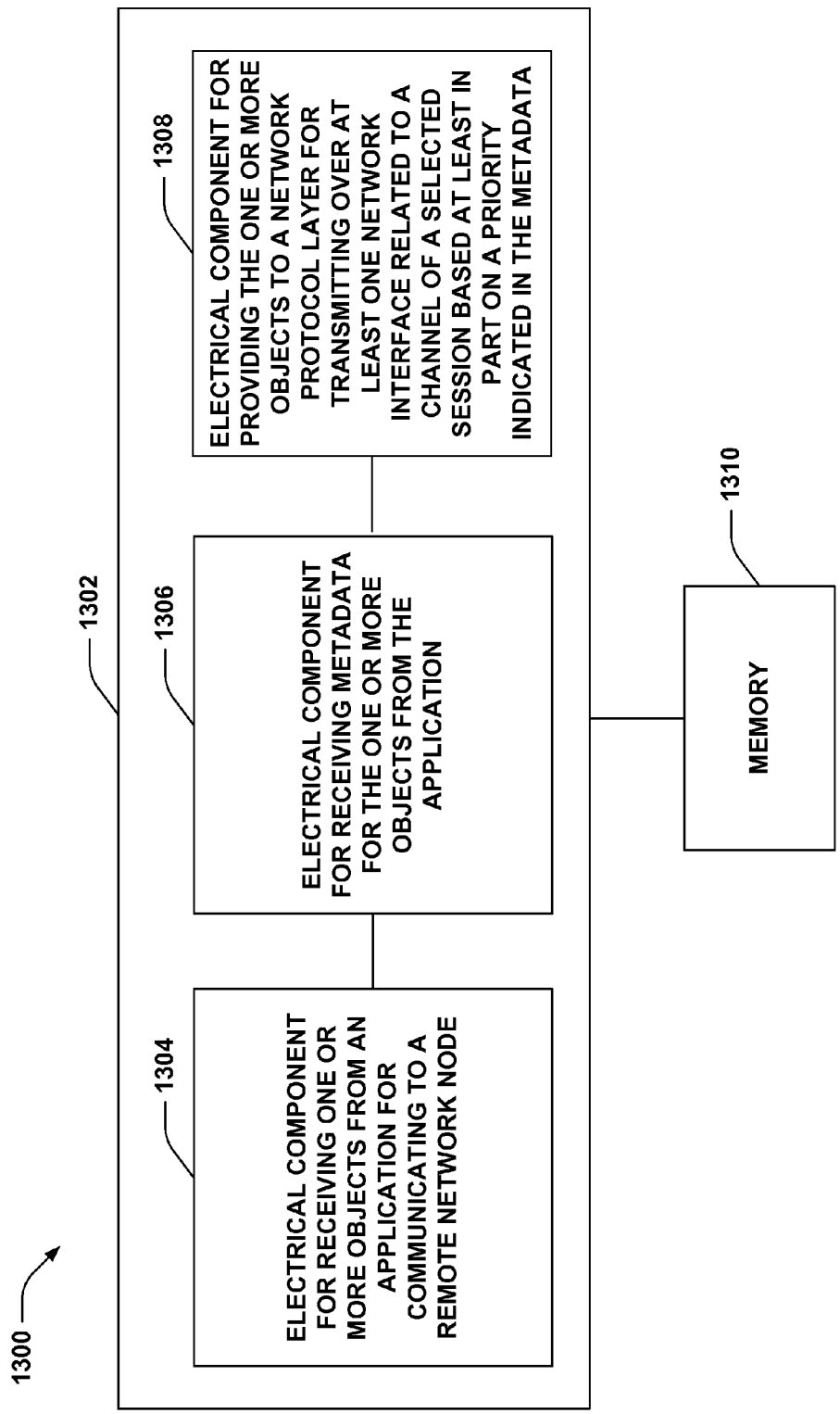
FIG. 13 illustrates an example system for communicating objects over an object-based transport protocol.

With reference to FIG. 13, illustrated is a system 1300 that facilitates communicating over an object-based transport protocol. For example, system 1300 can reside at least partially within a base station, mobile device, computer, server, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for receiving one or more objects from an application for communicating to a remote network node 1304. As described, objects can be framed by the application and can be of an arbitrary size. Further, logical grouping 1302 can comprise an electrical component receiving metadata for the one or more objects from the application 1306.

As described, for example, the metadata can include a priority of the object, transmission deadline, identifier, tag, and/or the like. Moreover, logical grouping 1302 can include an electrical component for providing the one or more objects to a network protocol layer for transmitting over at least one network interface related to a channel of a selected session based at least in part on a priority indicated in the metadata 1308. As described, electrical component 1308 can send the one or more objects in the session based at least in part on determining a sending opportunity for the session, which can also be based on the priority of the one or more objects. For example, in an aspect, electrical component 1304 can include object receiving component 502, etc. as described above. In addition, for example, electrical component 1306, in an aspect, can include object properties associating component 504, etc., as described above. Moreover, in an example, electrical component 1308, in an aspect, can include object communicating component 506, etc., as described.

Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310. In one example, electrical components 1304, 1306, and 1308 can comprise at least one processor, or each electrical component 1304, 1306, or 1308 can be a corresponding module of at least one processor. Moreover, in an additional or alternative example, electrical components 1304, 1306, and 1308 can be a computer program product comprising a computer readable medium, where each electrical component 1304, 1306, or 1308 can be corresponding code.

Figure 14:
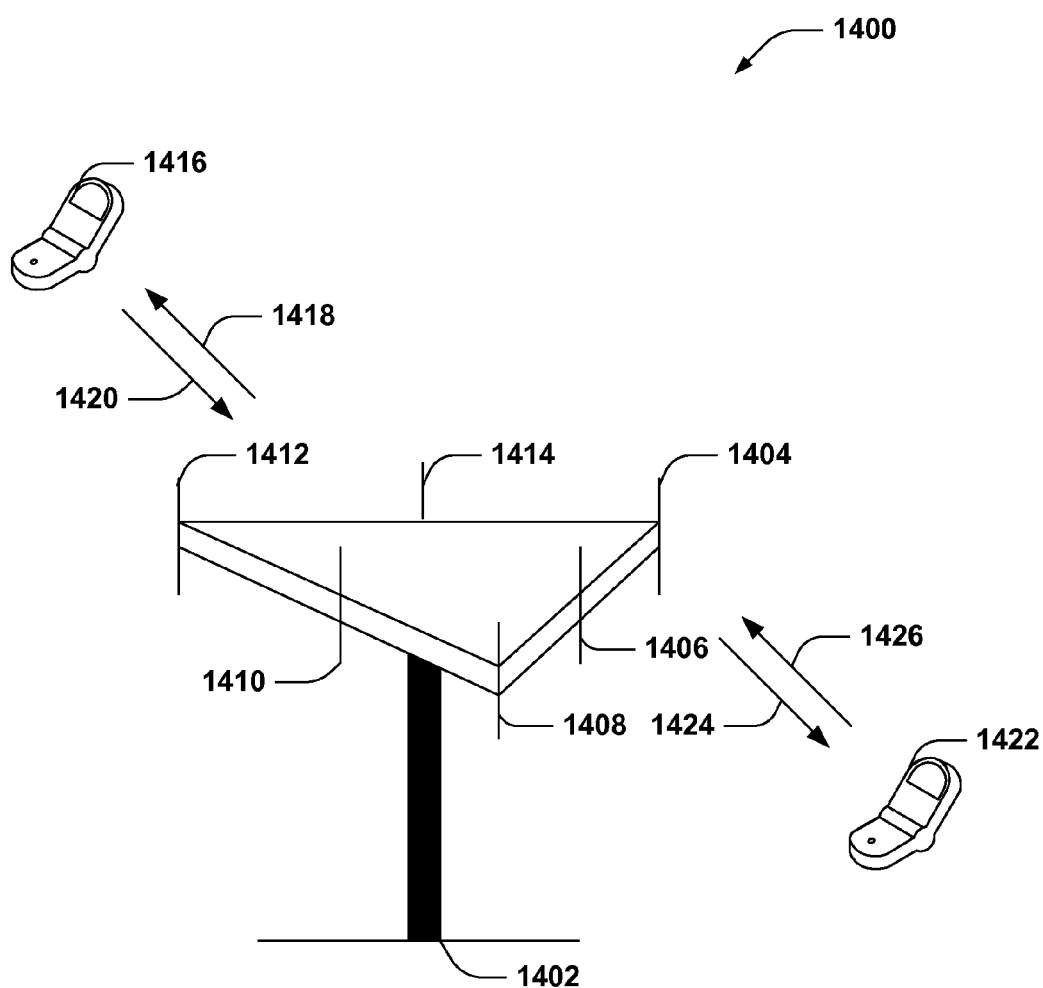
FIG. 14 illustrates a wireless communication system in accordance with various aspects set forth herein.

Referring now to FIG. 14, a wireless communication system 1400 is illustrated in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology as depicted. According to an example, system 1400 can be a multiple-input multiple-output (MIMO) communication system.

Figure 15:
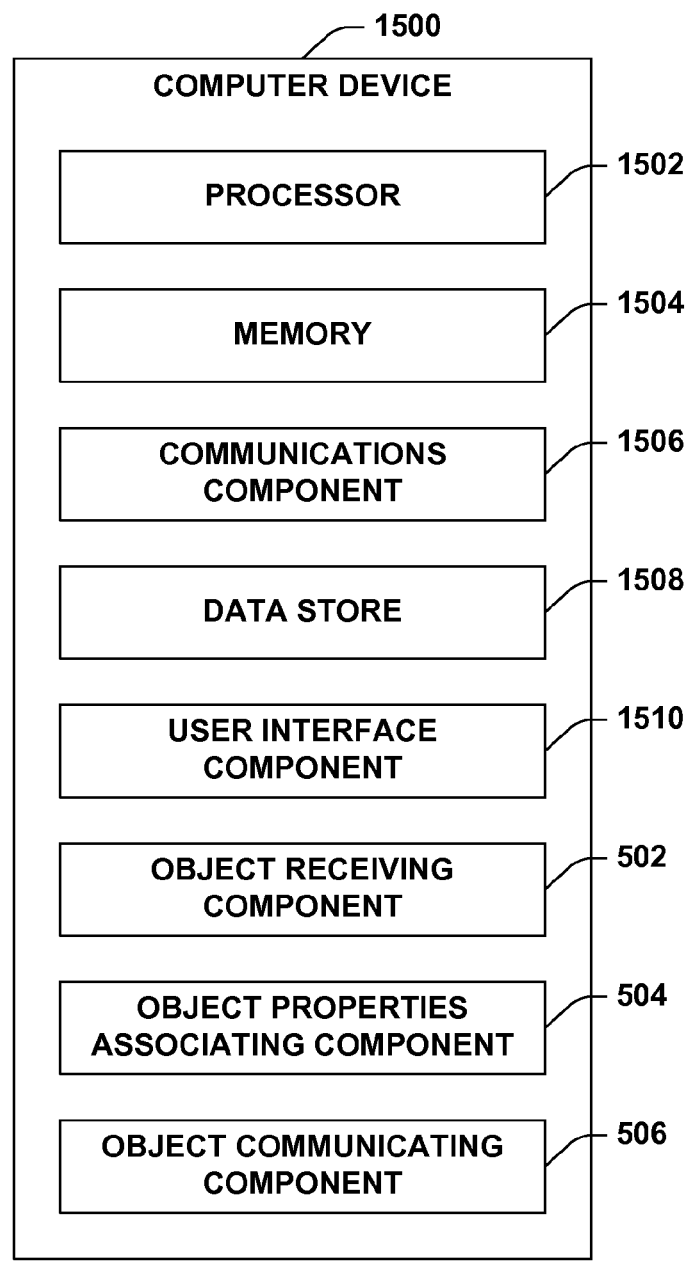
FIG. 15 illustrates an example computer device that can be employed in conjunction with the various systems and methods described herein.

Referring to FIG. 15, in one aspect, any of network nodes 102, 104, 302, 304, 400, 500, 602, or 604 (e.g., FIGS. 1 and 3-6) may be represented by computer device 1500. Computer device 1500 includes a processor 1502 for carrying out processing functions associated with one or more of components and functions described herein. Processor 1502 can include a single or multiple set of processors or multi-core processors. Moreover, processor 1502 can be implemented as an integrated processing system and/or a distributed processing system.

Computer device 1500 further includes a memory 1504, such as for storing local versions of applications being executed by processor 1502. Memory 1504 can include substantially any type of memory usable by a computer, such as random access memory (RAM), read only memory (ROM), tapes, magnetic discs, optical discs, volatile memory, non-volatile memory, and any combination thereof.

Further, computer device 1500 includes a communications component 1506 that provides for establishing and maintaining communications with one or more parties utilizing hardware, software, and services as described herein. Communications component 1506 may carry communications between components on computer device 1500, as well as between computer device 1500 and external devices, such as devices located across a communications network and/or devices serially or locally connected to computer device 1500. For example, communications component 1506 may include one or more buses, and may further include transmit chain components and receive chain components associated with a transmitter and receiver, respectively, operable for interfacing with external devices. In addition, for example, communications component 1506 can leverage an object-based transport protocol, as described herein (e.g., object-based transport protocol 200 in FIG. 2).

Additionally, computer device 1500 may further include a data store 1508, which can be any suitable combination of hardware and/or software, that provides for mass storage of information, databases, and programs employed in connection with aspects described herein. For example, data store 1508 may be a data repository for applications not currently being executed by processor 1502.

Computer device 1500 may additionally include a user interface component 1510 operable to receive inputs from a user of computer device 1500, and further operable to generate outputs for presentation to the user. User interface component 1510 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1510 may include one or more output devices, including but not limited to a display, a speaker, a haptic feedback mechanism, a printer, any other mechanism capable of presenting an output to a user, or any combination thereof.

In addition, in the depicted example, computer device 1500 can include an object receiving component 502, an object properties associating component 504, and an object communicating component 506, as described above. Thus, these components 502, 504, and 506 can utilize processor 1502 to execute instructions associated therewith, memory 1504 to store information associated therewith, communications component 1506 to carry out operations on the object-based transport layer, and/or the like, as described. In addition, it is to be appreciated that computer device 1500 can include additional or alternative components described herein.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of providing an object-based transport layer in network communications, comprising:
   receiving one or more objects from an application of the object-based transport layer for communicating to a remote network node;
   receiving metadata for the one or more objects from the application of the object-based transport layer, the metadata comprising a priority for ordering the one or more objects by the object-based transport layer for sending over a network protocol layer;
   selecting, by the object-based transport layer, a session for communicating the one or more objects to the remote network node; and
   providing, from the object-based transport layer, the one or more objects to the network protocol layer for transmitting over at least one network interface related to a channel of the session based at least in part on the priority received in the metadata.

2. The method of claim 1, further comprising:
   detecting a sending opportunity for the at least one network interface; and
   determining that the priority of the one or more objects is higher than at least a different priority of a different object in the session or a different session having the channel or a different channel related to the at least one network interface, wherein the providing the one or more objects is based at least in part on the determining.

3. The method of claim 2, wherein the detecting the sending opportunity includes analyzing congestion control for the channel to determine that the channel is available for transmitting the one or more objects over the at least one network interface.

4. The method of claim 2, wherein the detecting the sending opportunity includes analyzing a state of the session to determine that the session is available for transmitting the one or more objects over the at least one network interface.

5. The method of claim 1, further comprising:
   determining a transmission deadline related to one or more different objects in the session; and
   cancelling transmission of the one or more different objects based at least in part on passing of the transmission deadline.

6. The method of claim 1, further comprising receiving a request from the remote network node to modify one or more properties of subsequent objects related to the one or more objects.

7. The method of claim 6, further comprising:
   modifying the one or more properties of one or more subsequent objects related to the one or more objects, wherein the one or more properties includes a modified priority; and
   providing the one or more subsequent objects to the network protocol layer for transmitting over the at least one network interface related to the channel of the session based at least in part on the modified priority.

8. The method of claim 1, further comprising receiving a request from the remote network node to modify a state of the channel or the session.

9. The method of claim 8, further comprising placing the session on hold based at least in part on the request.

10. The method of claim 1, further comprising establishing an additional channel related to a different network interface to the session for communicating with the remote network node.

11. The method of claim 10, further comprising establishing the additional channel with the remote network node at least in part by communicating a request to establish the additional channel including a security association received from the remote network node over the channel.

12. The method of claim 10, further comprising:
    removing the channel from the session; and
    providing one or more subsequent objects related to the one or more objects to the network protocol layer for transmitting over the different network interface related to the additional channel based at least in part on the priority indicated for the one or more subsequent objects.

13. The method of claim 1, further comprising encoding the one or more objects using an erasure code to generate a plurality of object coding protocol data units (PDU), wherein the providing the one or more objects to the network protocol layer includes providing the one or more object coding PDUs to the network protocol layer.

14. The method of claim 1, further comprising:
    receiving at least a portion of one or more response objects from the remote network node based at least in part on the one or more objects; and
    providing the one or more response objects to the application based at least in part on identifying the one or more response objects as related to the one or more objects.

15. The method of claim 14, further comprising providing the metadata to the network protocol layer for transmitting over the at least one network interface related to the channel of the session, wherein the metadata includes response properties for the one or more response objects.

16. The method of claim 15, further comprising transmitting a request to modify the response properties to the remote network node.

17. The method of claim 15, further comprising transmitting a request to modify a state of a different session or a different channel related to the one or more response objects to the remote network node.

18. The method of claim 14, further comprising:
receiving one or more different object coding protocol data units (PDU) corresponding to the one or more response objects from a different remote network node;
determining that the one or more different object coding PDUs relate to the one or more response objects; and
merging the one or more different object coding PDUs with one or more object coding PDUs received from the remote network node to form the one or more response objects.

19. The method of claim 1, wherein the one or more objects vary in size.

20. An apparatus for providing an object-based transport layer in network communications, comprising:
at least one processor configured to:
obtain one or more objects from an application of the object-based transport layer for communicating to a remote network node;
obtain metadata for the one or more objects from the application of the object-based transport layer, the metadata comprising a priority for ordering the one or more objects by the object-based transport layer for sending over a network protocol layer;
determine, by the object-based transport layer, a session for communicating the one or more objects to the remote network node; and
communicate, from the object-based transport layer, the one or more objects to the network protocol layer for transmitting over at least one network interface related to a channel of the session based at least in part on the priority indicated in the metadata; and
a memory coupled to the at least one processor.

21. An apparatus for providing an object-based transport layer in network communications, comprising:
means for receiving one or more objects from an application of the object-based transport layer for communicating to a remote network node;
means for receiving metadata for the one or more objects from the application of the object-based transport layer, the metadata comprising a priority for ordering the one or more objects by the object-based transport layer for sending over a network protocol layer; and
means for providing, from the object-based transport layer, the one or more objects to the network protocol layer for transmitting over at least one network interface related to a channel of a selected session based at least in part on the priority indicated in the metadata.

22. A computer program product for providing an object-based transport layer in network communications, comprising:
a non-transitory computer-readable medium, comprising:
code for causing at least one computer to obtain one or more objects from an application of the object-based transport layer for communicating to a remote network node;
code for causing the at least one computer to obtain metadata for the one or more objects from the application of the object-based transport layer, the metadata comprising a priority for ordering the one or more objects by the object-based transport layer for sending over a network protocol layer;
code for causing the at least one computer to determine, by the object-based transport layer, a session for communicating the one or more objects to the remote network node; and
code for causing the at least one computer to communicate, from the object-based transport layer, the one or more objects to the network protocol layer for transmitting over at least one network interface related to a channel of the session based at least in part on the priority indicated in the metadata.

23. An apparatus for providing an object-based transport layer in network communications, comprising:
an object receiving component for obtaining one or more objects from an application of the object-based transport layer for communicating to a remote network node;
an object properties associating component for receiving metadata for the one or more objects from the application of the object-based transport layer, the metadata comprising a priority for ordering the one or more objects by the object-based transport layer for sending over a network protocol layer; and
an object communicating component for providing, from the object-based transport layer, the one or more objects to the network protocol layer for transmitting over at least one network interface related to a channel of a selected session based at least in part on the priority indicated in the metadata.

24. The apparatus of claim 23, wherein the object communicating component provides the one or more objects to the network protocol layer based at least in part on detecting a sending opportunity for the at least one network interface and determining that the priority for the one or more objects is higher than at least a different priority of a different object in the selected session or a different session that has the channel or a different channel over the at least one network interface.

25. The apparatus of claim 24, wherein the object communicating component detects the sending opportunity at least in part by analyzing congestion control for the channel to determine whether the channel is available for transmitting the one or more objects over the at least one network interface.

26. The apparatus of claim 24, wherein the object communicating component detects the sending opportunity at least in part by analyzing a state of the selected session to determine whether the selected session is available for transmitting the one or more objects over the at least one network interface.

27. The apparatus of claim 23, wherein the object communicating component is further configured to determine a transmission deadline related to one or more different objects in the selected session, and cancel transmission of the one or more different objects based at least in part on the transmission deadline.

28. The apparatus of claim 23, further comprising an object properties modifying component for receiving a request from the remote network node to modify one or more properties of subsequent objects related to the one or more objects.

29. The apparatus of claim 28, wherein the object properties modifying component modifies the one or more properties of one or more subsequent objects related to the one or more objects, and the object communicating component provides the one or more subsequent objects to the network protocol layer for transmitting over the at least one network interface related to the channel of the selected session.

30. The apparatus of claim 23, further comprising an object properties modifying component for receiving a request from the remote network node to modify a state of the channel or the selected session.

31. The apparatus of claim 30, further comprising a session state updating component for placing the channel or the selected session on hold based at least in part on the request from the remote network node.

32. The apparatus of claim 23, wherein the object communicating component adds an additional channel related to a different network interface to the selected session for communicating with the remote network node.

33. The apparatus of claim 32, wherein the object communicating component establishes the additional channel with the remote network node at least in part by communicating a request to establish the additional channel including a security association received from the remote network node over the channel.

34. The apparatus of claim 32, wherein the object communicating component removes the channel from the selected session.

35. The apparatus of claim 23, further comprising an object coding component for encoding the one or more objects using an erasure code to generate a plurality of object coding protocol data units (PDU), wherein the object communicating component provides the plurality of object coding PDUs to the network protocol layer.

36. The apparatus of claim 23, further comprising an object providing component that sends one or more response objects to the application, wherein the object communicating component receives the one or more response objects over the channel.

37. The apparatus of claim 36, wherein the object communicating component further communicates the metadata to the network protocol layer, wherein the metadata includes response properties for the one or more response objects.

38. The apparatus of claim 37, further comprising an object properties specifying component that transmits a request to modify the response properties to the remote network node.

39. The apparatus of claim 37, further comprising an object properties specifying component that transmits a request to modify a state of a different session or a different channel related to the one or more response objects to the remote network node.

40. The apparatus of claim 36, further comprising an object merging component for determining that one or more object coding protocol data units (PDU) received from the remote network node relate to one or more different object coding PDUs received from a different remote network node and merging the one or more object coding PDUs with the one or more different object coding PDUs to form the one or more response objects.

41. The apparatus of claim 23, wherein the one or more objects vary in size.

* * * * *